US010102838B2

(12) United States Patent
McHale

(10) Patent No.: US 10,102,838 B2
(45) Date of Patent: Oct. 16, 2018

(54) TONE EFFECTS SYSTEM WITH REVERSIBLE EFFECTS CARTRIDGES

(71) Applicant: Andy McHale, Marysville, WA (US)

(72) Inventor: Andy McHale, Marysville, WA (US)

( * ) Notice: Subject to any disclaimer, the term of this patent is extended or adjusted under 35 U.S.C. 154(b) by 0 days.

(21) Appl. No.: 15/817,748

(22) Filed: Nov. 20, 2017

(65) Prior Publication Data

US 2018/0144731 A1 May 24, 2018

Related U.S. Application Data

(60) Provisional application No. 62/424,859, filed on Nov. 21, 2016.

(51) Int. Cl.

| | |
|---|---|
| ***G01P 3/00*** | (2006.01) |
| ***G10H 1/02*** | (2006.01) |
| ***G10H 1/34*** | (2006.01) |
| ***G10H 1/00*** | (2006.01) |
| ***G10H 1/18*** | (2006.01) |

(52) U.S. Cl.

CPC ........... *G10H 1/348* (2013.01); *G10H 1/0008* (2013.01); *G10H 1/18* (2013.01); *G10H 2210/155* (2013.01); *G10H 2220/021* (2013.01); *G10H 2240/171* (2013.01)

(58) Field of Classification Search

CPC ........ G10H 1/348; G10H 1/0008; G10H 1/18; G10H 2210/155; G10H 2220/021; G10H 2240/171

USPC .............................................................. 84/626

See application file for complete search history.

(56) References Cited

U.S. PATENT DOCUMENTS 4,481,661 A * 11/1984 Spector .................... H03G 5/04 361/726
4,509,190 A * 4/1985 Spector .................... H04R 3/12 381/119
4,936,185 A * 6/1990 Yamaguchi .............. G10H 1/32 200/52 R
5,349,129 A * 9/1994 Wisniewski ............. G10H 1/32 446/2

(Continued)

OTHER PUBLICATIONS

Console, https://www.kickstarter.com/projects/deviever/cosole-ii-cartridge-based-multi-fx-guitar-pedal, p. 1-13, May-Jun. 2012.

*Primary Examiner* — Jeffrey Donels
(74) *Attorney, Agent, or Firm* — Bold IP, PLLC; Wooshik Shim; Houda El-Jarrah

(57) ABSTRACT

Embodiments are provided for a tone effects base unit, system, and method of using the tone effects base unit. A tone effects base unit includes an integrated housing and one or more slots integrated into the housing. The one or more slots are configured to receive reversible sound effects cartridges, whereby the reversible sound effects cartridge include one or more sound effects that are applicable to sound produced from an electric instrument and emitted from an amplifier. A tone effects base unit is configured to include one or more effects mode lights associated with each slot so that the one or more effects mode lights is illuminated a predetermined color depending on whether a reversible sound effects cartridge is inserted into the slot or not and depending on whether the reversible sound effect cartridge is inserted in a normal mode or in an FX loop mode orientation.

18 Claims, 16 Drawing Sheets

(56) References Cited

U.S. PATENT DOCUMENTS

| | | | | | |
|---|---|---|---|---|---|
| 5,648,753 | A * | 7/1997 | Martin | A63H 5/00 340/384.1 |
| 6,132,281 | A * | 10/2000 | Klitsner | A63H 5/00 446/397 |
| 6,353,168 | B1 * | 3/2002 | Sosoka, Jr. | G10H 1/0008 446/397 |
| 6,376,761 | B1 * | 4/2002 | LaMarra | G10H 1/02 381/118 |
| 6,664,460 | B1 * | 12/2003 | Pennock | G10H 1/0091 381/118 |
| 7,326,849 | B2 * | 2/2008 | Adams | G10H 1/0066 84/743 |
| 8,420,923 | B1 * | 4/2013 | Choi | G10H 1/32 84/476 |
| 8,525,015 | B2 * | 9/2013 | Armstrong | G10H 1/348 381/118 |
| 9,012,759 | B2 | 4/2015 | Hummel | |
| 9,373,315 | B1 | 6/2016 | Hummel | |
| 9,415,324 | B2 * | 8/2016 | Shaanti | A63H 33/042 |
| 9,520,116 | B2 * | 12/2016 | Hummel | H04R 1/028 |
| 9,530,395 | B2 * | 12/2016 | Friesen | G10H 1/06 |
| 2004/0040434 | A1 * | 3/2004 | Kondo | G10H 1/0008 84/604 |
| 2013/0327201 | A1 * | 12/2013 | Urry | G10H 1/06 84/626 |
| 2014/0270214 | A1 * | 9/2014 | Brandt | G10H 1/0091 381/61 |

* cited by examiner

TONE EFFECTS SYSTEM WITH REVERSIBLE EFFECTS CARTRIDGES

CROSS-REFERENCE TO RELATED APPLICATIONS

The present application is a non-provisional application which claims the benefit of U.S. provisional patent application Ser. No. 62/424,859, filed on Nov. 21, 2016, which is incorporated herein by reference in its entirety as if fully set forth herein.

FIELD OF DISCLOSURE

The overall field of the invention is electronic instrument effects. More specifically, the present invention is an apparatus for removable, reversible sound effect cartridges (i.e. sound effect modules) that are able to be inserted into the normal amplification circuit or the effect loop circuit of the amplification system by reversing the installation position of the cartridge in the base unit.

BACKGROUND

Sound effect modules (also referred to as cartridges) are electronic devices that allow musicians to manipulate the signal produced from an electric or electronic instrument. The first practical sound effect modules to be used regularly outside of the studio were those built into amplifiers using vacuum tubes. With the emergence of the electronic transistor, sound effects circuitry was able to be even further condensed into small, portable containers commonly referred to as effect pedals (FX pedals), or stomp boxes. Effect pedals can be designed to produce one or more effects and typically provide a number of controls for adjusting the extent to which the sound of the instrument is manipulated. There are many such existing effect pedals available for musicians who play electronic instruments, and in particular, electric guitars.

Effect pedals may be used for a variety of sound effects, and include pedals that may be categorized as distortion pedals, chorus pedals, reverb pedals, and/or multi-effects pedals. Distortion pedals work by increasing the harmonic qualities of the guitars natural sound, creating the "hard" guitar tones commonly associated with rock, punk and metal music. Chorus pedals, in simple terms, help to repeat an electric guitar's input signal, allowing a guitarist to make it sound as though more than one guitar is playing. Reverb pedals layer a guitar's natural sound to simulate echoes, and allow a guitarist to create the sound one would hear while playing in a wide variety of locations. Multi-effects pedals may include effects such as reverb, chorus, and distortion, as well as a multitude of other sound effects, such as a compressor, booster, wah-wah, overdrive, fuzz, distortion, phaser, or flanger. Utilizing such pedals provides a guitarist the ability to achieve a desired sound quality, tone, dimension, and effect that the guitarist truly wants to achieve.

One issue with the use of effect pedals with electric guitars is the effects loop with a connected amplifier. The effects loop is an output/input (send/receive) that enables a user to insert effects between the preamp/equalizer section and the power section of an amplifier. Some amplifiers were built without an effects loop only allowing effects to be run straight into the front of the amp. This creates a problem when the gain channel of the amplifier is used for an overdrive tone. In general, time-based effects like delay and reverb, and modulation effects, tend to sound more natural when applied to the signal after it is overdriven. When the modulation is applied before the overdrive, it can lead to a duller sound. With the introduction of higher gain preamps that produce overdrive, manufacturers started creating effects loops so that modulation and time-based effects could be inserted into the amplifier after the overdrive channel, and before the power amp, thus keeping the overdrive first in line.

Other issues while using multiple effect pedals are the cables used to connect the effects to one another, the power cords used to supply each effect pedal with operating power supply, the physical space required for each effect pedal enclosure, and the baseplate the pedals are temporarily attached to (normally using a hook and loop fastening system) commonly referred to as a pedalboard. Each cable connecting one pedal to another is two potential failure points (one at each connection) to emit loud, startling, unwanted, and possibly speaker damaging tones, or mute the entire effect chain all together. The power cord to each pedal adds a third failure point that can also mute the effect chain or insert unwanted noise into the signal path. With the multitude of cables connecting the effect pedals together, the user can easily become confused as to whether the effect pedal chain is connected to the front of the amp or to the effects loop, and also be limited in the orientation of installation on the pedalboard, causing awkward positioning of the activation/deactivation switches. This can cause distractions from performance, failure to activate or deactivate the effect when desired, and in rare cases possible injury to users due to loss of balance and concentration. Accordingly, because of these and many other problems with conventional technology, there still exists a need for an improved system and method for enabling a musician to produce high-quality sound effects while playing his or her electronic instrument.

SUMMARY

In one aspect, embodiments in the present description are directed to a tone effects base unit. In one exemplary embodiment, the tone effects base unit includes a housing having one or more slots integrated into the housing of the tone effects base unit. Further, the tone effects base unit may include a plurality of connectors situated within each slot of the one or more slots. Further, the tone effects base unit may include one or more effect mode lights, whereby the one or more effect mode lights is associated with a different slot of the one or more slots. In addition to the above, in one or more non-limiting embodiments, the tone effects base unit may include one or more foot switches, such that each of the one or more foot switches are associated with a different slot from the one or more slots. Further, the tone effects base unit may further include one or more of status lights, whereby each of the one or more status lights are associated with a different foot switch of the one or more foot switches. Additionally, a microcontroller may be configured to communicate with the plurality of connectors, the one or more slots, the one or more effect mode lights, the one or more foot switches, and the one or more status lights of the tone effects base unit. The tone effects base unit may further include at least one normal signal input port, at least one normal signal output port, at least one FX input port, and at least one FX output port.

In yet another aspect, embodiments in the present description are directed to an exemplary method for using the tone effects base unit in combination with at least one reversible sound effects cartridge having one or more sound effects.

Further, one or more embodiments may provide for a method of using the tone effects base unit as connected to an electric instrument and also to at least one amplifier. According to one or more non-limiting embodiments, a method for using a tone effects base unit may include providing the at least one reversible sound effects cartridge, and inserting the at least one reversible sound effects cartridge into a particular slot of a set of slots on the tone effects base unit. The exemplary method may further include inserting the at least one reversible sound effects cartridge in a normal mode orientation into the particular slot. Inserting the at least one reversible sound effects cartridge in the normal mode allows one or more sound effects of the at least one reversible sound effect cartridge to be applied to sound produced from an associated electric instrument out of a connected amplifier without passing the sound through the FX loop.

Conversely, the exemplary method may further include inserting the at least one reversible sound effects cartridge in a FX loop mode orientation by inserting the at least one reversible sound effects cartridge 180 degrees from the normal mode orientation into the particular slot, whereby inserting the at least one reversible sound effects cartridge in the FX loop mode orientation allows the one or more sound effects of the at least one reversible sound effects cartridge to be applied to the sound produced from the associated electric instrument out of the connected amplifier after passing through the FX loop. The preceding and following embodiments and descriptions are for illustrative purposes only and are not intended to limit the scope of this disclosure.

Other aspects and advantages of this disclosure will become apparent from the following detailed description.

DETAILED DESCRIPTION

Figure 1:
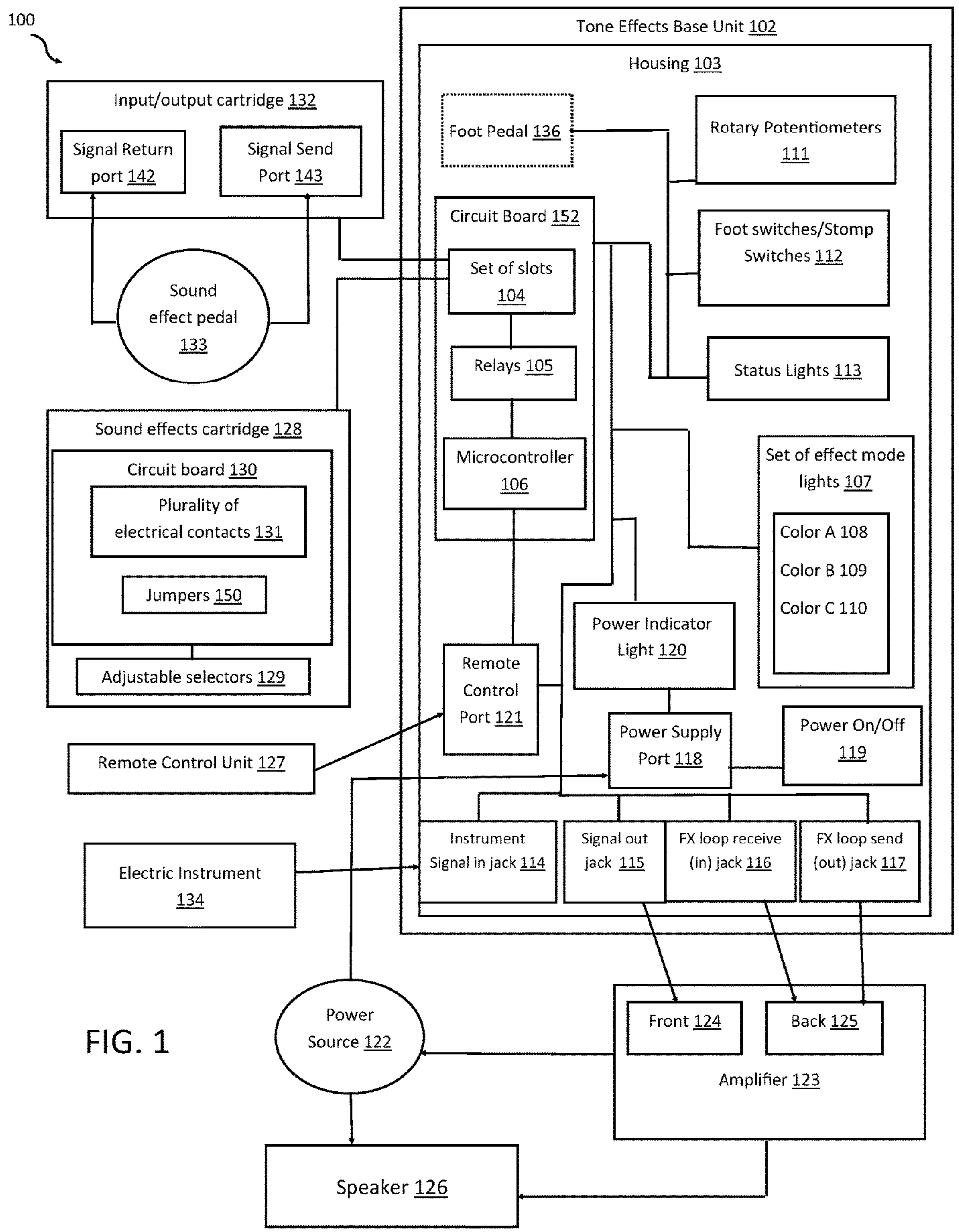
FIG. 1 is a block diagram of an exemplary system for using a tone effects base unit in accordance with an illustrative embodiment.

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined).

References in the singular tense include the plural, and vice versa, unless otherwise noted. Further, as used herein, the term "coupled" or "coupling" may indicate a connection. The connection may be a direct or an indirection connection between one or more items. Further, the term "set" as used herein may denote one or more of any item. Throughout the drawings, like reference characters are used to designate like elements. Further, the drawings are not to scale and depicted components or structures may have dimensions other than those depicted or perceived in the drawings.

Embodiments in the present description are directed to a tone effects system for use with electric or electronic instruments that allows for utilizing both the effects loop circuit of the amplifier and/or the normal amplification circuit as well as allowing interchangeability of the type of tone effect that is being used. While the tone effects system is intended for use with electric guitars, the tone effects system can be used with any other electric or electronic instrument, including microphones.

It is an object of the one or more embodiments in the present description to provide a system (e.g. tone system base unit and reversible cartridges) that integrates multiple individual effect modules and gives them the ability to utilize both the effect loop (also referred to as the FX loop) and the main instrument circuit of the amplifier. In one embodiment, at least one slot is integrated into a tone system base unit, while a reversible effects cartridge is attached to the base unit via the slot. The slot provides interchangeability of the effect module's electronic connections between the electric musical instrument (e.g. electric guitar) and the effects cartridge. The effects cartridge provides the circuitry for manipulating the received electronic signal, as well as controls for adjusting the extent to which the effect is applied to the electronic signal and fine tuning the applied effect for a desired tone or sound.

The embodiments provided in this disclosure give a musician much more creativity and control by placing interchangeable and reversible tone effects controls within reach while the instrument is being played, while eliminating the clutter, confusion, and failure points of cables connecting multiple effects pedals together, which is an ongoing issue with existing pedals. Further, the embodiments provided in this disclosure may also improve ergonomics and safety for a musician using the system for a tone system base unit described herein, and may ensure positive activation/deactivation of the intended effect when desired by the musician.

Turning to FIG. 1, FIG. 1 is a block diagram of a system (e.g. system 100) that uses a tone effects base unit, such as tone effects base unit 102. A tone effects base unit 102 is shown in exemplary form in FIGS. 2-9. Tone effects base unit 102 may be used to produce a variety of sound effects using one or more sound effects cartridges, such as sound effects cartridge 128. As shown in FIG. 1, an electric instrument, such as electric instrument 134 may be coupled to tone effect base unit 102. Electric instrument 134 may be any type of musical instrument without limitation. In one embodiment, electric instrument 134 may be an electric guitar. Further, electric instrument 134 may be a microphone in some embodiments. Further, system 100 may further include coupling an amplifier, such as amplifier 123 to tone effect base unit 102 and speaker 126. Any suitable amplifier known in the art may be used. Both a front side, such as front side 124 of amplifier 123 and a back side, such as back side 125 of amplifier 123 may be used in a system and method of producing various sound effects provided by the reversible sound cartridges 128 (further described below) that may be inserted into slots of tone effects base unit 102.

In addition to the above, amplifier 123 may also be connected to speaker 126. Speaker 126 may be any suitable speaker known in the art. Amplifier 123 may be used to amplify or boost any electric signals (including sounds produced from electric instrument 134 and altered by sound effects cartridges 128).

Figure 7:
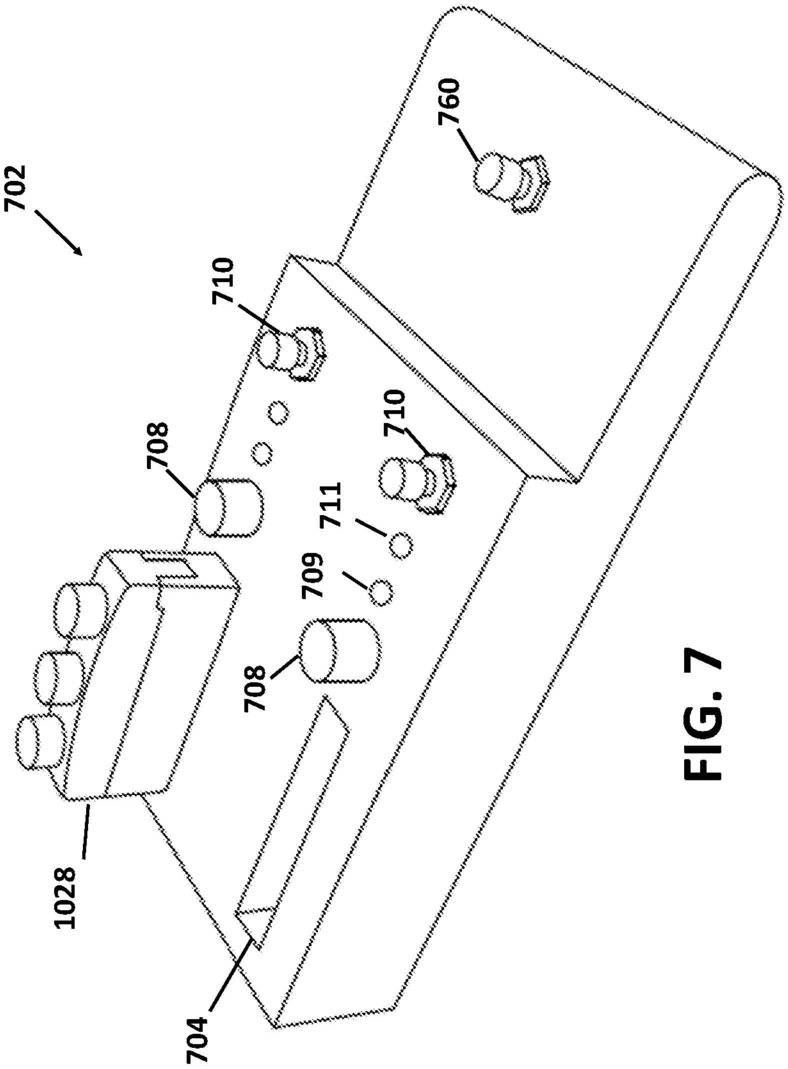
FIG. 7 is a perspective view of another embodiment of a tone effects base unit in accordance with an illustrative embodiment.
Figure 8:
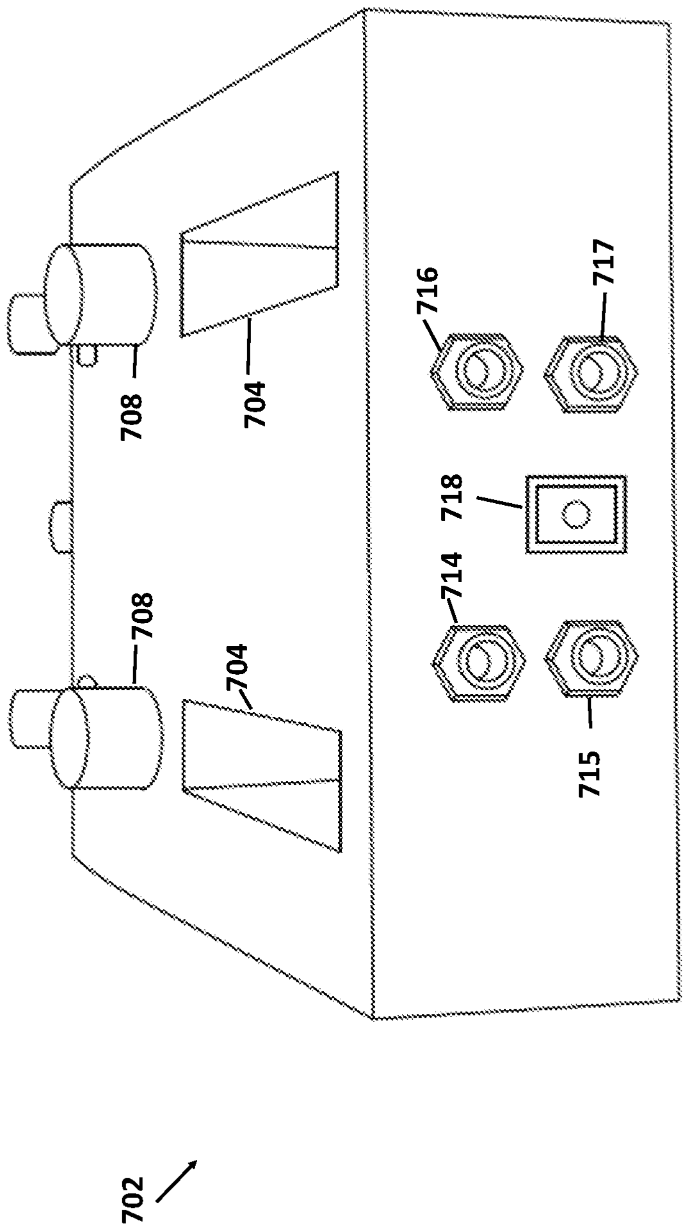
FIG. 8 is a rear view of the tone effects base unit shown in FIG. 7 in accordance with an illustrative embodiment.
Figure 9:
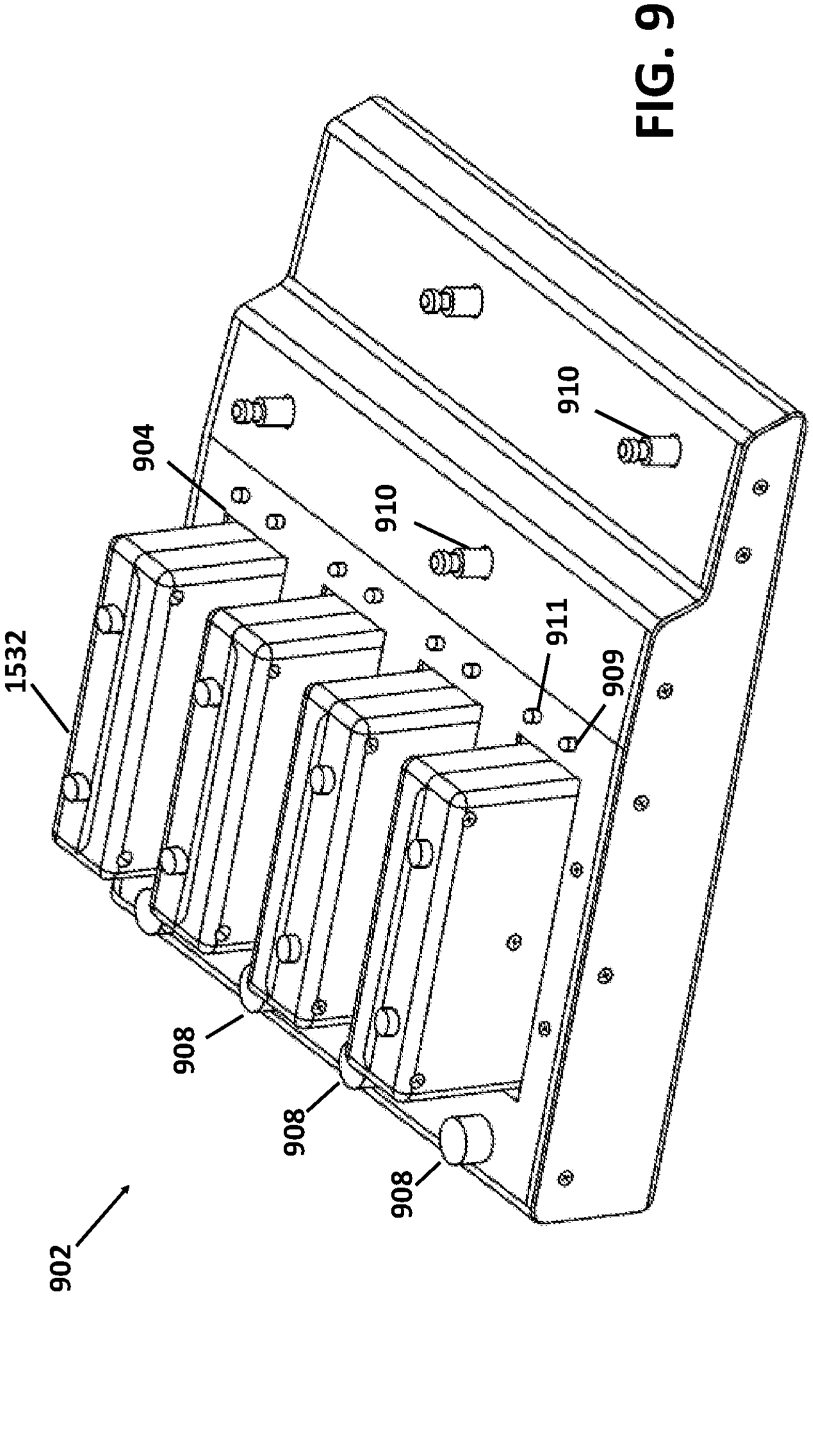
FIG. 9 is a perspective view of another embodiment of a tone effects base unit in accordance with an illustrative embodiment.

Tone effect base unit 102 may include a housing 103 or body that includes one or more components listed below, and other electronic components as well. In one embodiment, tone effects base unit 102 may include a set of slots, such as set of slots 104. As used herein, the term "set" may refer to one or more item. Therefore, in various embodiments, tone effect base unit 102 may include at least one slot or more than one slot. FIGS. 2-6 show an exemplary embodiment of an 8 slot base unit in accordance with tone effects base unit 102 in FIG. 1. FIGS. 7-8 show an exemplary embodiment of a 2 slot base unit in accordance with tone effects base unit 102 in FIG. 1. Further, FIG. 9 shows an exemplary embodiment of a 4 slot base unit in accordance with tone effects base unit 102 in FIG. 1. Those of ordinary skill in the art will appreciate that base unit 102 may include any number of slots in various configurations and is not limited to the number of slots in any base unit depicted in the attached illustrations. In other embodiments, tone effect base unit 102 may also include a touch screen and user interface.

Each slot of the set of slots of tone effect base unit 102 may receive a sound effects cartridge, such as sound effects cartridge 128. Sound effects cartridge 128 may include a circuit board, such as circuit board 130 located within sound effects cartridge 128. Circuit board 130 may contain an effects circuit, and as many effects controls (e.g. adjustable selectors 129) as required by the effects circuit design. Adjustable selectors 129 located on a casing of sound effects cartridge 128 may include, but is not limited to, potentiometers, switches, rotary encoders, and/or buttons, or any other type of suitable selector known in the art. In other embodiments, sound effects cartridge 128 may also include a touch screen and user interface.

Further, sound effects cartridge 128 may include a plurality of electrical contacts 131. Plurality of electrical contacts 131 may be located, in some embodiments, towards the bottom edge of sound cartridge, such as sound effects cartridge 128 and may be electronically connected to a slot of the set of slots 104 when plurality of electrical contacts 131 is inserted in a slot of set of slots 104. Additionally, plurality of electrical contacts 131 and jumpers 150 may be electronically connected to circuit board 130 in sound effects cartridge 128. Further, adjustable selectors 129 may also be electronically coupled to circuit board 130 for sound effects cartridge 128. Circuit board 130 may be any suitable circuit board known to those skilled in the art.

In one or more embodiments, when sound effects cartridge 128 is inserted into the tone effect base unit 102, the plurality of electrical contacts 131 for sound effects cartridge 128 mate with corresponding electrical contacts within each slot 104 of tone base effect unit 102. This action may electrically connect the circuit board 130 of sound effects cartridge 128 to the electronics within tone effects base unit 102. Accordingly, it may be desirable in some exemplary embodiments for the plurality of electrical contacts 131 to be located on the bottom edges of each sound effects cartridge 128 (i.e. connectable card-edge) in such a manner that when the sound effects cartridge 128 is inserted into a slot, the plurality of electrical contacts 131 are able to mate 128 with corresponding electrical contacts within each slot 104 of tone base effect unit 102. Further, when sound effects cartridge 128 is removed, rotated 180 degrees and reinserted in to the slot 104, the opposite electrical contacts within each slot 104 will become activated (e.g. as shown FIGS. 16 and 17).

Further, sound effects cartridge 128 may include one or more jumpers 150 as known in the art. In one embodiment, jumpers 150 may allow microcontroller 106 to close an electrical circuit, allowing the electricity to flow on certain sections of the circuit board 130. More information is provided regarding jumpers 150 later in the present description.

Circuit board 152 may further be included within the interior of housing 103. Circuit board 152 may be electronically connected to multiple components of tone effects base unit 102 including, but not limited to, foot switches/stomp switches 112, status lights 113, rotary potentiometers 111, set of slots 104, relays 105, microcontroller 106, instrument signal in jack 114, signal out 115, FX loop receive (in) jack 116, FX loop send (out) jack 117, set of effect mode lights 107, remote control port 121, power indicator light 120, power supply port 118, and power on/off switch 119. Circuit board 152 in tone effects base unit 102 may be any type of circuit board known to those of ordinary skill in the art. Further, more than one circuit boards 152 may be used in various configurations without limitation with any size or number thereof. Any of the components (or a fewer portion and number thereof) may be electronically connected to circuit board 152 in any desired arrangement.

Further, in FIG. 1, set of slots 104 may be a set of grooves of a predetermined size and shape to correspond to the size and shape of sound effects cartridge 128 and/or input/output cartridge 132. In one or more embodiments, set of slots 104 are physically formed into a portion of the housing 103 of tone effects base unit 102, and are adapted to receive sound effects cartridge 128 and/or input/output cartridge 132. Further, set of slots 104, relays 105, and microcontroller 106 may be electronically connected to circuit board 152, although other embodiments may include alternative configurations.

In addition to the above, one or more sound effects cartridge 128 may be inserted into one or more slots of the set of slots 104. Sound effects cartridge 128 is designed to be secured in the slot when inserted, and is also designed to be quickly removed with a predetermined force by a user (e.g. user of instrument 134) pushing or pulling or otherwise manipulating a position of sound effects cartridge 128 into a desired slot of set of slots 104. When inserted into desired slot of the set of slots 104, sound effects cartridge 128 may be configured to produce the tone effect associated with any sound effects pedal known in the art. Such tone effects or sound effects may include, but are not limited to, a compressor, booster, wah-wah, overdrive, fuzz, distortion, phaser, flanger, chorus, reverb, delay, or amp modeler pedal sound effect. Sound effects cartridge 128 may produce one or more sound effects, but can also quickly and easily be removed and replaced with another sound effects cartridge configured to produce a different sound effect.

Further, it is a unique aspect of the one or more embodiments of sound effects cartridge 128 that sound effects cartridge 128 is reversible. Accordingly, sound effects cartridge 128 is designed to be quickly removed and reinserted 180 degrees to switch the channel from normal to FX loop or vice versa. More details regarding sound effects cartridge 128 may be provided below with respect to FIGS. 10-12.

Figure 3:
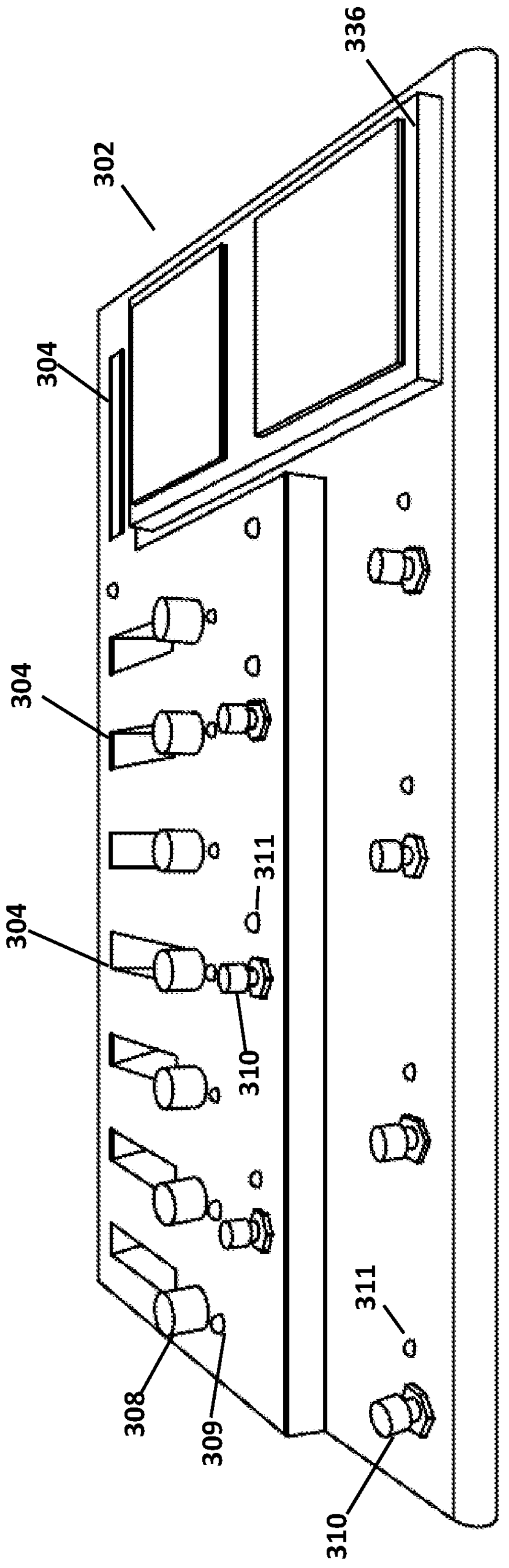
FIG. 3 is a front view of a tone effects base unit having eight slots in accordance with an embodiment of the present description in accordance with an illustrative embodiment.

Continuing with tone effect base unit 102, set of slots 104 may be vertically oriented and/or horizontally oriented. For example, FIG. 3 shows tone effects base unit 302 having seven vertically oriented slots 304 (in accordance with set of slots 104) and a single horizontally oriented slot 304 located above foot pedal 336. Thus, set of slots 104 may be oriented in any desired direction and/or orientation in various embodiments. Set of slots 104 is configured to receive one or more sound effects cartridges, such as sound effects cartridge 128.

Set of slots 104 may be electronically connected to a microcontroller, such as microcontroller 106 located within an interior of tone effect base unit 102. Microcontroller 106 may be any type of microcontroller known in the art. Microcontroller 106 is programmable and may be used to control one or more lights, such as effects mode lights 107 and status lights 113 included on tone effect base unit 102, relays such as relay 105, and to switch between a normal to FX loop or vice versa. Further, microcontroller 106 may include its own memory storage and/or be coupled to a separate memory component. In one non-limiting embodiment, microcontroller 106 has twenty-four (24) digital input electrical contacts, thirty-three (33) digital output electrical contacts, and a communications bus.

In addition to the above, a plurality of relays, such as relays 105 may be electronically connected to microcontroller 106 and also electronically connected to each slot of the set of slots 104. In one embodiment, each slot may include at least two relays controlled by the microcontroller to provide switching of the signal paths, although more or less relays may also be used.

As shown in FIG. 1, a set of effects mode lights, such as effects mode lights 107 may be associated with each slot of the set of slots 104. In FIG. 3, effect mode lights 309 correspond to a set of effect mode lights in accordance with set of effect mode lights 107 in FIG. 1. In one embodiment, each effect mode light of the set of effect mode lights 107 is a multi-lead red-green-blue (RGB) LED. Accordingly, such an RGB LED is configured to provide at least three distinctive colors, such as color A 108, color B 109, and color C 110. Color A 108, color B 109, and color C 110 may be pre-determined colors that are illuminated and displayed responsive to whether or not a sound effect cartridge, such as sound effects cartridge 128 is inserted into a slot on base unit 102 and depending on whether the inserted sound effects cartridge 128 is inserted in a normal mode or inserted 180 degrees from normal so as to correspond to the FX loop. As noted later below, in some non-limiting embodiments, color A 108 may be green, color B 109 may be blue, and color C 110 may be red. In other embodiments the effect mode light may be a different type of light or split into individual lights.

In some embodiments, each slot of set of slots 104 may have its own rotary potentiometer, such as rotary potentiometer(s) 111. A rotary potentiometer in accordance with rotary potentiometer(s) 111 may be used to control a tone effect and level (e.g. volume level). Further, each slot of the set of slots 104 may have its own foot switch, including a foot switch from set of foot switches 112. In one embodiment, the rotary potentiometer(s) 111 are configured to be hand operated while set of foot switches 112 may be stepped (or stomped) on by a musician or other use. As shown in FIG. 3, footswitches 310 are in accordance with foot switches 112 from FIG. 1 and may be stepped on with one's foot to activate or deactivate (on or off), whereas rotary potentiometers 308 shown in FIG. 3 may be rotated or turned with one's hand so as to control an effect and/or level of a sound effects cartridge (e.g. cartridge 128) if it were inserted in any of the slots 304 shown in FIG. 3.

In addition to the above, each foot switch 112 includes a status light, such as status lights 113. In the shown embodiments (e.g. FIG. 3), each status light 113 (e.g. 311 is an LED. In other embodiments, the effect status light 113 may be any type of light, or series of multiple lights. Status lights 113 may be a single color LED, in some embodiments, and display a single pre-determined color to indicate that the status light is either on or off (i.e. activated or not activated). The color of the single color LED when used for a status light of the set of status lights 113 may be any color including but not limited to white, green, or red as desired. Alternatively, the LED used for each status light of the set of status lights 113 may be multi-colored such as the RGB LED light used for the effect mode lights 107.

As further explained below, status light 113 may be commanded (e.g. by microcontroller 106) to be ON when a corresponding slot from set of slots 104 has a sound effect cartridge 128 inserted in it and a corresponding footswitch (e.g. 112) has also been stepped on i.e. activated. More details regarding status lights 113 may be found later below.

Figure 4:
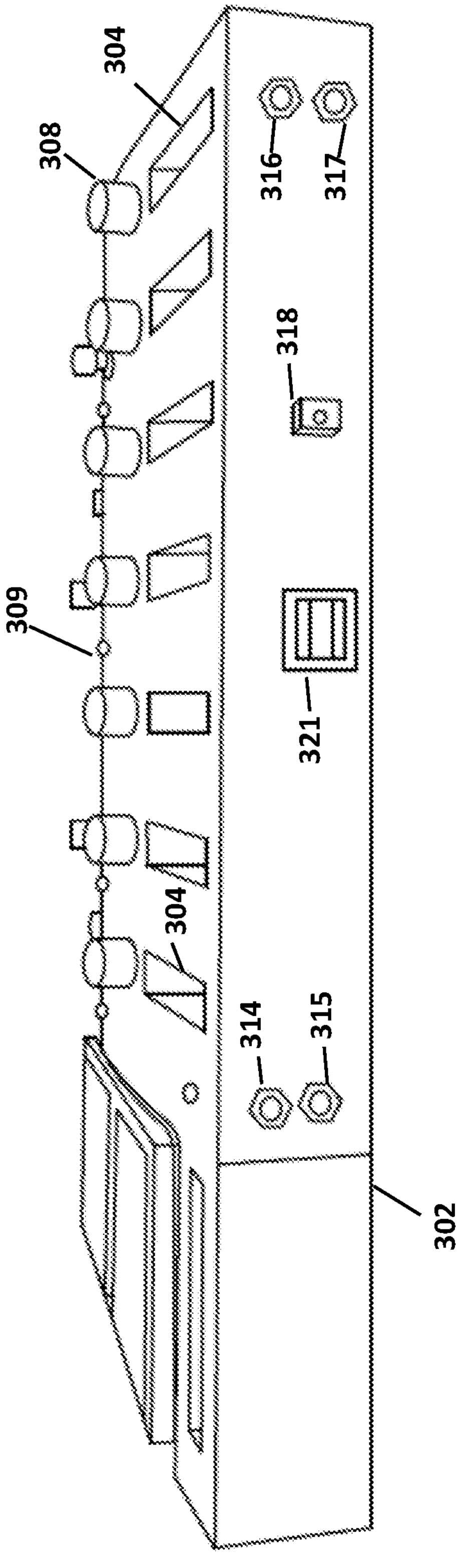
FIG. 4 is a rear view of the tone effects base unit shown in FIG. 3 in accordance with an illustrative embodiment.
Figure 5:
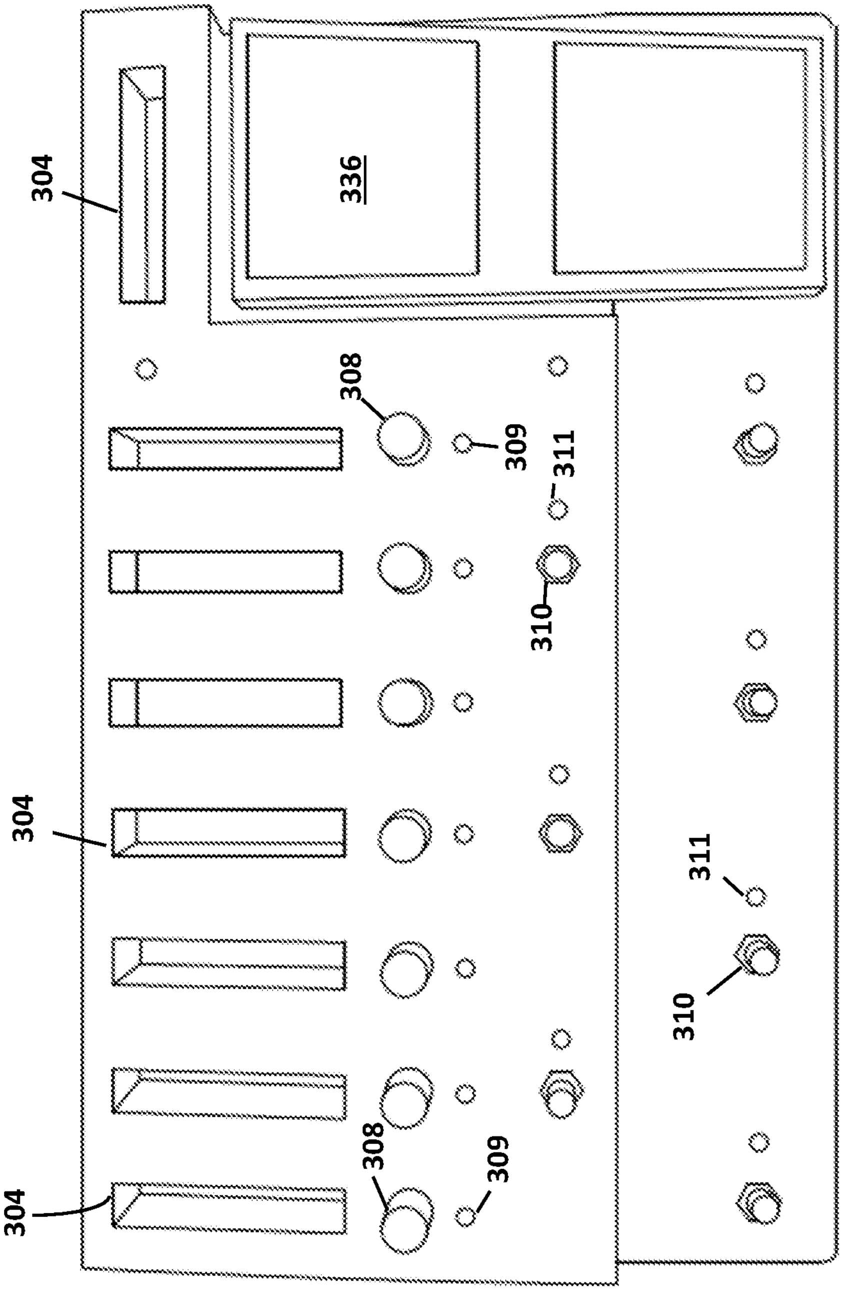
FIG. 5 is a top view of the tone effects base unit shown in FIG. 3 in accordance with an illustrative embodiment.

In addition to the above, tone effect base unit 102 may further include at least one instrument signal in jack 114, one signal out jack 115, one FX loop receive (in) jack 116, and one FX loop send (out) jack 117. FIG. 4 provides a rear view of a tone effects base unit, such as tone effects base unit 102, and thus may also clearly show an exemplary embodiment of the above-identified components (e.g. 114-117). Those of ordinary skill in the art may appreciate that in other embodiments more or less ports and jacks and connectors may also be included without limitation. Further, instrument signal in jack 114, signal out jack 115, FX loop receive (in) jack 116, and FX loop send (out) jack 117 may each or all be located elsewhere on an exterior housing 103 of tone effects base unit 102 other than the rear surface of tone effects base unit 102. Thus, it is possible that some or all such ports and jacks are located on other sides of tone effects base unit 102 in various embodiments.

Figure 2:
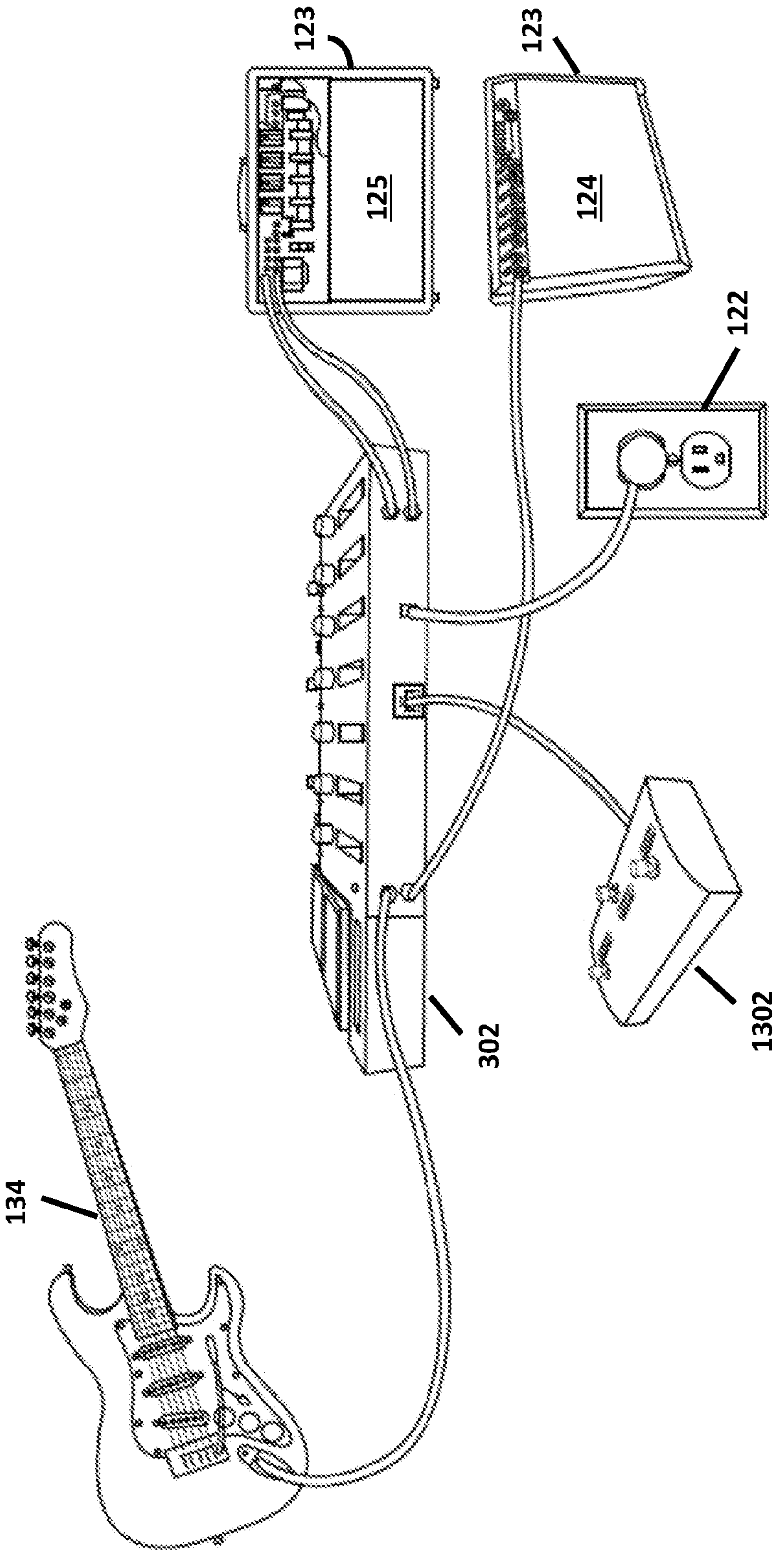
FIG. 2 is a pictorial illustration of components of an exemplary system for using a tone effects base unit in accordance with an illustrative embodiment.

A power source, such as power source 122 may be connectable to power tone effect base unit 102. Tone effect base unit 102 is electrically connected to power source 122, such that the power source 122 supplies current to the electronic components of the tone effect base unit 102 and the electronic components on the installed sound effects cartridges 128. Further, power source 122 may also provide power to a connected amplifier 123, as shown in FIG. 1 and FIG. 2. In the shown embodiment in FIGS. 3, 7, and elsewhere, the power supply port (e.g. power supply port 118) is an integrated unit that connects tone effect base unit 102 to a standard power source such as a wall outlet. In other embodiments, each base unit 102 may be configured to include one or more rechargeable or non-rechargeable batteries, including any type of batteries known in the art. If the embodiment includes a rechargeable battery or batteries, then a charging port may be integrated into the tone effect system.

In one embodiment, power source 122 supplies each slot of the set of slots 104 with isolated ±18 VDC, and supplies microcontroller 106 with ±3.3 VDC and/or ±5 VDC. In other embodiments, different voltages are possible. Further, tone effects base unit 102 includes a power ON/OFF switch, such as power ON/OFF switch 119, which allows a user to turn on and off tone effect base unit 102. Other embodiments may or may not have a power ON/OFF switch. Further, in one or more embodiments, tone effects base unit 102 may also include an external light, such as power indicator light 120, to indicate when power ON/OFF switch 119 is in the ON mode.

In addition to the above, in some embodiments, one or more foot pedals, such as foot pedal 136 may also be incorporated into base unit 102 for various reasons. In one embodiment, a foot pedal such as foot pedal 136 may be used instead of a foot switch to activate an inserted sound effect cartridge in a corresponding slot and manipulate or adjust the signal passing through the sound effect cartridge in the corresponding slot. For example, FIG. 3 shows foot pedal 336, which may be in accordance with foot pedal 135 of FIG. 1. Foot pedal 336 may be activated and pressed with one's foot.

Figure 13:
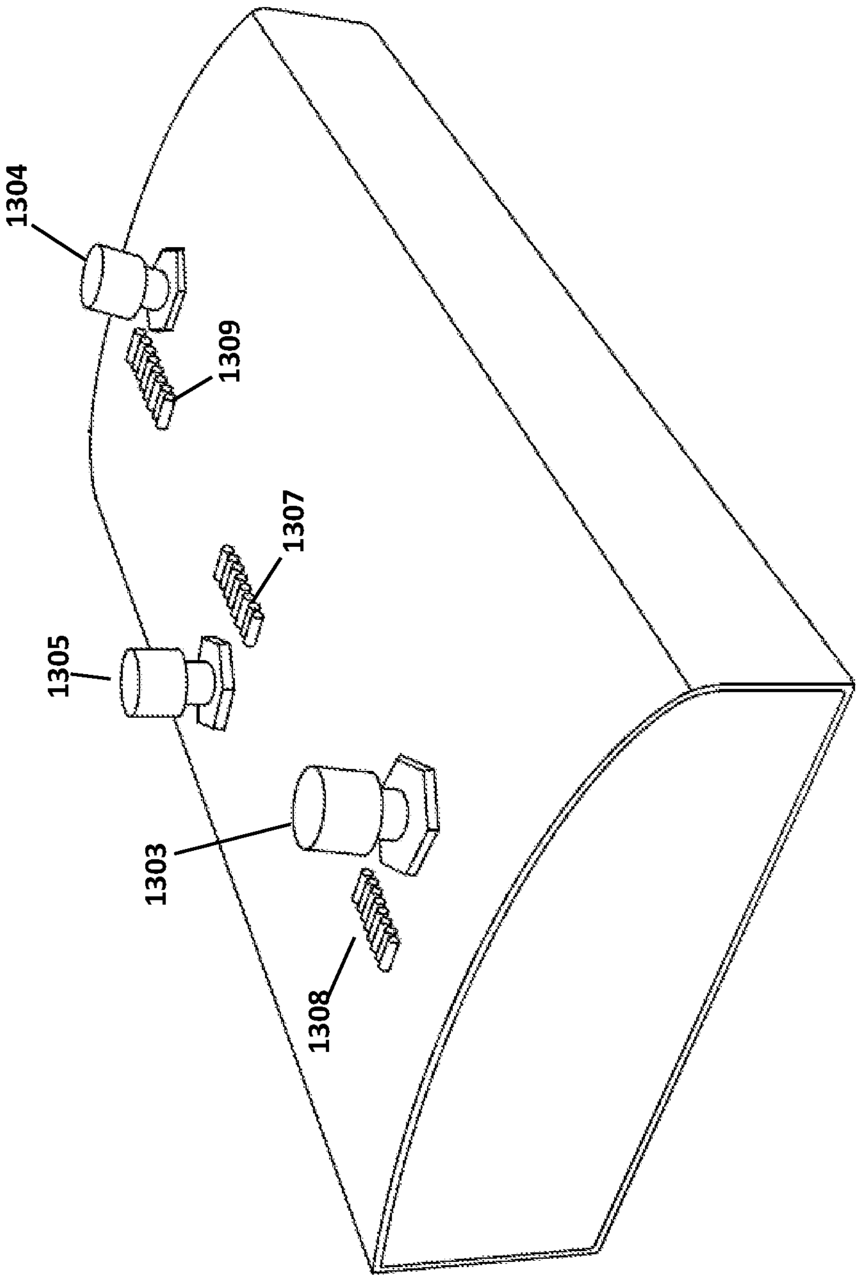
FIG. 13 is a perspective view of remote controller unit in accordance with an illustrative embodiment.

In addition to the above, in some embodiments, a remote control unit, such as remote control unit 127 may be coupled to tone effect base unit 102 via remote control port 121. FIG. 13 shows an exemplary embodiment of a remote control unit. Remote control unit 1302 may be in accordance with remote control unit 127. In some embodiments remote control unit 127 may be used to store a desired configuration of "scene switches" that may cause a number of slots of the set of slots 104 to activate or deactivate simultaneously. More details are provided below regarding remote control unit 127 with respect to remote control unit 1302 shown in FIG. 13.

Further included in system 100 of FIG. 1, in one or more embodiments, a musician is also enabled to couple one or more existing sound effect pedal(s), such as sound effect pedal 133 to tone effect base unit 102. A musician or other user may do so by inserting an input/output cartridge, such as input/output cartridge 132 into one of the slots of the set of slots 104 located on tone effect base unit 102. Input/output cartridge 132 may include one or more ports, such as signal return port 142 and signal send port 143 so that a user may run cables from sound effect pedal 133 to signal return port 142 and signal send port 143. Sound effect pedal 133 may be any existing sound effect known in the art and available in the market. Such sound effect pedals 133 produce a number of effects that may be useful to a musician of electric instrument 134, and this embodiment allows the musician or other user to connect his or her sound effect pedal 133 to tone effect base unit 102 via input/output cartridge 132. Any sound effects provided by sound effects pedal 133 will be translated to the output of the sound as fed to amplifier 123 and speaker 126 from tone effects base unit 102 via the inserted input/output cartridge 132.

Turning to FIG. 2, FIG. 2 shows a pictorial illustration of system 100. As shown in FIG. 2, an electric guitar (e.g. electric instrument 134) is connected to tone effects base unit 302 (which may be a base unit in accordance with base unit 102 shown in FIG. 1). The electric guitar is shown connected via a cable to a instrument signal input jack (e.g. 314 shown in FIG. 4). Amplifier 123 may include a front side 124 and a back side 125. In one embodiment, a cable is used to connect from the front side 124 of amplifier 123 to the signal out jack (e.g. 315 shown in FIG. 4) of tone effects base unit 302.

Further, tone effects base unit 302 may include a power supply port, such as power supply port 318 which connects to a power source, such as power source 122, which in this illustrated embodiment is shown to be an electrical outlet. In other embodiments, power source 122 may be a power adapter such as an AC to DC adapter or international plug adapter. Alternatively, or additionally, tone effects base unit 302 may include a battery housing to hold one or more batteries so that tone effects base unit 302 may receive its power from such batteries.

In addition to the above, FIG. 2 illustrates an exemplary FX loop connection between tone effects base unit 302 and a backside 125 of amplifier 123. Accordingly, FIG. 2 illustrates that a cable may connect from the FX loop receive (in) jack (e.g. 316) of tone effects base unit 302 to a corresponding port located on a back side 125 of amplifier 123. Further, another cable may be used to connect from the FX loop send (out) jack (e.g. 317) of tone effects base unit 302 to a corresponding port located on a back side 125 of amplifier 123.

Not shown in FIG. 2 is a speaker, but it is possible for amplifier 123 to be separately connected or coupled to such as speaker (e.g. speaker 126 in FIG. 1). It is implied that the amplifier will also be connected to the power source in accordance with manufacturer's recommendations and additional adaptors if/when necessary. In additional embodiments, additional elements can be added such as, but not limited to, additional speakers or tone effect base units, like base unit 302 shown in FIGS. 2-6, base unit 702 shown in FIG. 7-8, or base unit 902 shown in FIG. 9.

FIG. 2 additionally shows how a remote control unit, such as remote control unit 1302, which is further discussed below with respect to FIG. 13, may be connected via cable to the remote controller port 321 of tone effects base unit 302.

FIGS. 3-6 show different views of tone effects base unit 302, which may be equivalent to tone effects base unit 102 shown in FIG. 1 and discussed above. As shown in FIGS. 3-6, tone effects base unit 302 includes eight slots 304, although any number of slots may be used in alternative embodiments and in any desired orientation (e.g. vertical, horizontal, angled, or a combination thereof). An effect mode light 309, which may be in accordance effect mode light 107, is associated with each one of the slots 304. Further, a stomp switch (e.g. footswitch) 310 is also associated with each one of the slots 304. Stomp switch 310 may include a status light, such as status light 311. As noted above, stomp switch 310 may be equivalent to footswitch 112 as shown in FIG. 1 and discussed above, and status light 311 may be equivalent to status light 113 shown in FIG. 1 and discussed above.

Further, each rotary potentiometer, such as rotary potentiometer 308 is associated with each slot 304. Rotary potentiometer 307 (in accordance with rotary potentiometers 111 in FIG. 1) may be used to control a tone effect and level of a sound effect cartridge that is insertable within the slots 304 of tone effects base unit 302.

As shown in FIG. 4 in a rear view of tone effects base unit 302, tone effects base unit 302 includes one signal-in jack 314, one signal-out jack 315, an effects loop input jack 316 and an effects loop output jack 317, a power supply port 318, and an external (remote) controller port 321. In some embodiments, tone effects system may also include a power indicator light, such as power indicator light 120 to indicate when tone effects base unit 102 is powered ON or OFF. A microcontroller (not shown in FIG. 3), in accordance with microcontroller 106, may be located within a housing of tone effects base unit 302. In additional embodiments, there may be more signal in/out jacks, such as signal in jack 314 and signal out jack 315, as well as more effects loop input jack 316 and effects loop output jack 317, as well as additional ports for connecting to various other components and/or devices.

In the shown embodiment in FIGS. 3-6, there are a total of seven (7) vertical cartridge slots 304 and one (1) horizontal slot 304. In one embodiment, each slot 304 further includes at least two relays in addition to the effect mode light 309 and the effect status light 311. In the embodiments shown in FIGS. 3-6, the horizontal slot 304 has a foot pedal potentiometer 336 for effect control (expression) of a sounds effect cartridge that is inserted into horizontal slot 304. Further, in some embodiments, an activation switch (not shown) may also be located under the foot pedal 336 to activate the sound effects cartridge. In the shown embodiment, the expression pedal (i.e. foot pedal 336) has two rubber mats to assist in decreasing the possibility of the user's foot slipping off the expression pedal 336. In additional embodiments, the expression pedal may or may not be present, and the pedal may have more or less rubber mats.

In the embodiment shown in FIGS. 2-6, stomp switches 310 are offset to reduce the possibility of activating two stomp switches at once. In additional embodiments, stomp switches 310 may be in line or on the same surface of the tone effects base unit 302.

Figure 6:
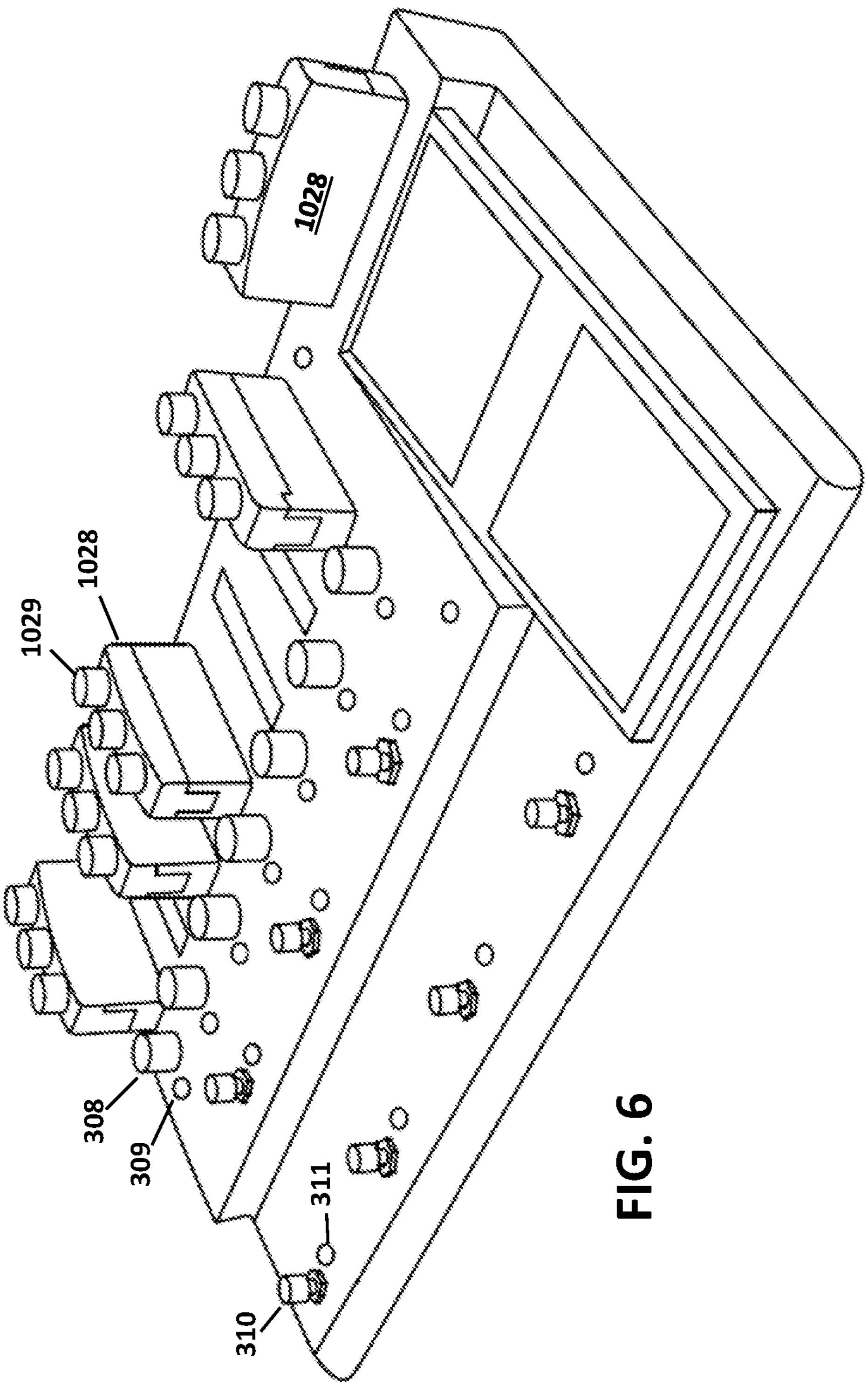
FIG. 6 is a perspective view of the tone effects base unit shown in FIG. 3 with multiple cartridges in accordance with an illustrative embodiment.
Figure 10:
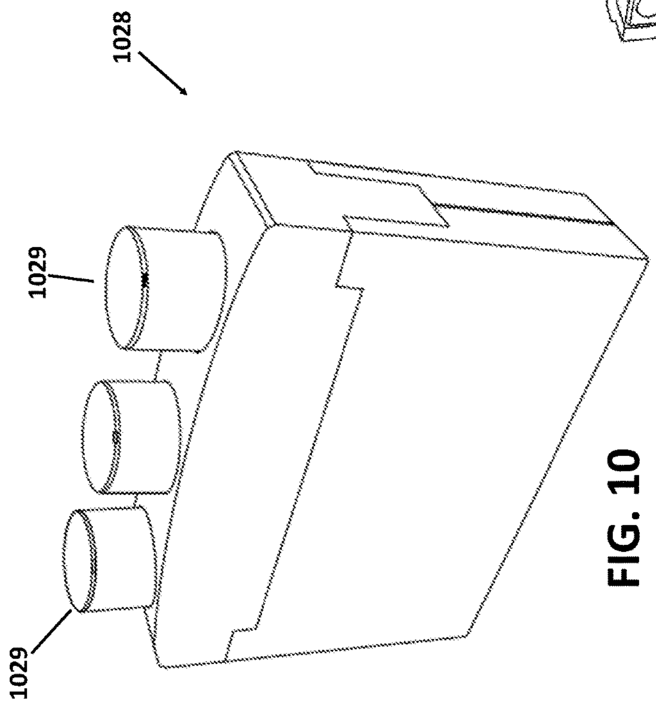
FIG. 10 is a perspective view of a reversible sound effects cartridge in accordance with an illustrative embodiment.

FIG. 6 shows an exemplary illustration of one or more sound effects cartridges, such as sound effects cartridges 1028 shown in FIG. 10, inserted into slots 304 of tone effects base unit 302. When inserted into slot 304, a predetermined color (e.g. color A, B, or C) of effect mode light 309 is illuminated to indicate whether sound effects cartridge 1028 is in a normal mode orientation or in a FX loop mode orientation, as further explained below. As shown in FIG. 6, a musician or other user may insert as many sound effects cartridges and into any slots 304 that he or she desires. Some slots may be left empty as shown in FIG. 6. Further, an input/output cartridge, such as input/output cartridge 1532 shown in FIG. 15 may be inserted into one or more of the slots 304 and an existing sound effect pedal coupled to one of the ports located on top of input/output cartridge 1532.

FIGS. 7-8 show another exemplary embodiment of a tone effects base unit, such as tone effects base unit 702 that has two slots 704. Tone effects base unit 702 may function in accordance with tone effects base unit 302 and 102. As shown in FIGS. 7-8, Tone effects base unit 702 includes two rotary potentiometers 708, which are in accordance with rotary potentiometers 308. Further, tone effects base unit 702 may include three stomp switches, in one or more non-limiting embodiments. As shown in FIG. 7, a sound effects cartridge, such as sound effects cartridge 1028 is inserted into one of the slots 704 of tone effects base unit 702.

As shown in FIGS. 7-8, there may be three stomp switches (i.e. foot switches) located on a top surface of tone effects base unit 702, with two stomp switches 710 located on a top portion of tone effects base unit 702. Further, there may be a third stomp switch, which is stomp switch 760 located on a lower surface of tone effects base unit 702. In some embodiments, the top two stomp switches 710 may be associated with each slot 704, and the third stomp switch 760 may be used to "swap" activation status of both slots 704 simultaneously.

Additionally, tone effects base unit 702 includes at least two mode lights 709 and at least two status effects lights 711. FIG. 8 further shows a non-limiting embodiment of a rear of tone effects system 702 which may include and four (4) signal jacks, such as, without limitation thereto, one instrument signal-in jack 714, one signal-out jack 715, one FX loop receive (in) jack 716, and one FX loop send (out) jack 717. Further, a power supply port, such as power supply port 718 is also included in the embodiment shown in FIG. 7. Similar to the embodiment shown above for tone effects base unit 302, this embodiment uses an integrated power supply with light and on/off switch and utilizes an external power source such as a standard wall outlet. Additional switches and jacks may be included in various configurations of this embodiment.

FIG. 9 shows another exemplary embodiment of a tone effects base unit. Tone effects base unit 902 may be a tone effects base unit in accordance with tone effects base unit 102 and 302 described above. Tone effects base unit 902 may include slots 904 that are adapted for receiving sound effects cartridges, such as sound effects cartridges 128 and/or input/output cartridge 132. In the embodiment shown in FIG. 9, each rotary potentiometer 908 is located behind each associated slot 904. Further, each slot 904 includes one effect mode light 909 and effect status light 911 in front of each slot 904. In other embodiments, the rotary potentiometers 908 may alternatively or additionally be located in front of each slot as well as next to or in front of each mode light 909 and status light 911.

Additionally, the embodiment of tone effects base unit 902 includes four stomp switches (i.e. foot switches) that are offset from each other and located on the upper and lower portions of tone effects base unit 902. While not shown, those of ordinary skill in the art will appreciate that tone effects base unit 902 may include other components in accordance with those discussed above with respect to tone effects base unit 102 and tone effects base unit 302, including various ports, signal in/out jacks, FX loop in/out jacks, and various other electronic components as well as a microcontroller. It is noted that four input/output cartridges 1532 are inserted into slots 904 of tone effects base unit 902. However, in alternative embodiments, any number of sound effects cartridges, such as sound effect cartridges 1028 or 1228 may be insertable instead of or in addition to an input/output cartridge 1532.

Figure 11:
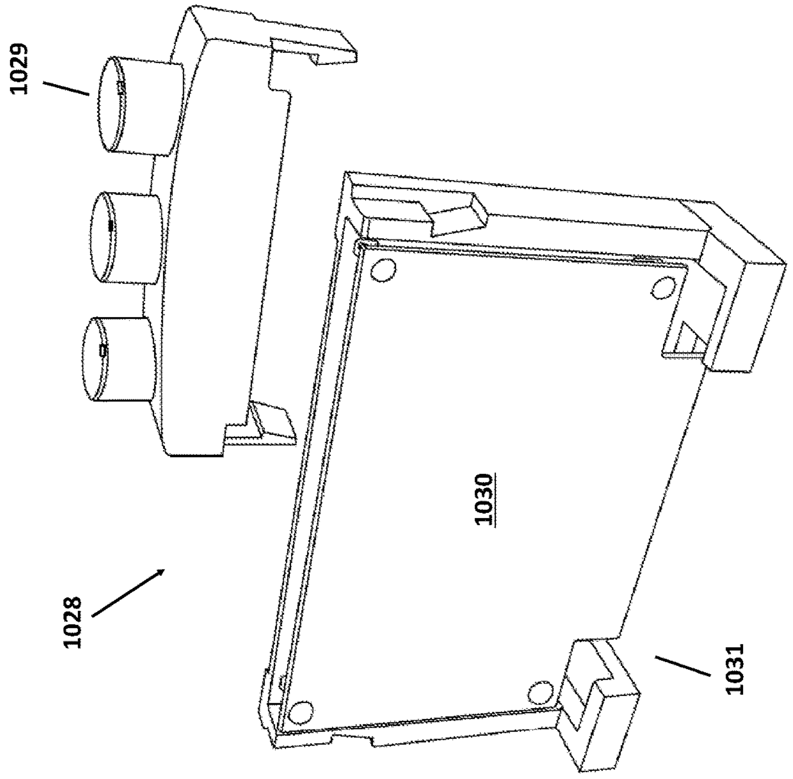
FIG. 11 is a perspective view of an interior of the reversible sound effects cartridge shown in FIG. 10 in accordance with an illustrative embodiment.
Figure 12:
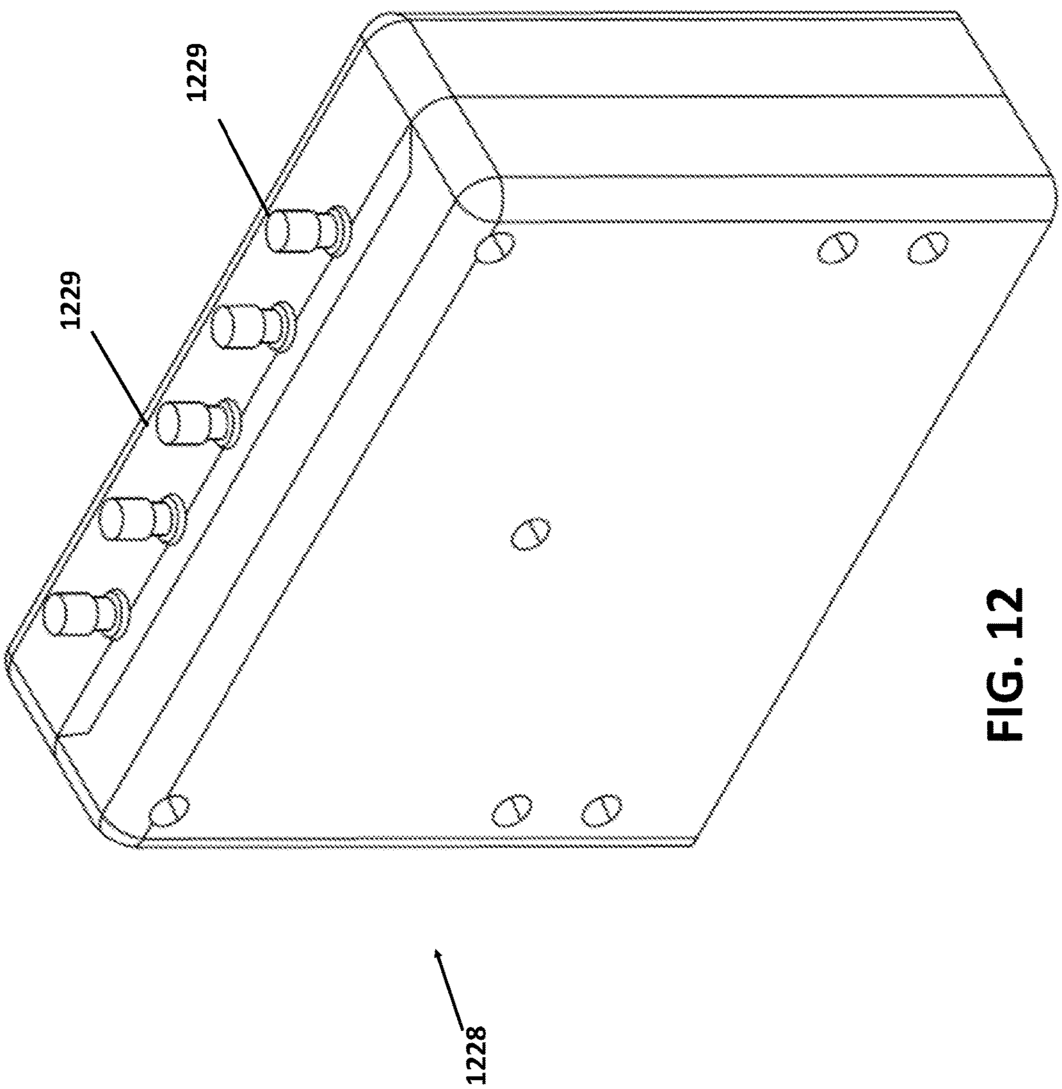
FIG. 12 is a perspective view of another embodiment of a reversible sound effects cartridge in accordance with an illustrative embodiment.

FIGS. 10-12 show embodiments of a reversible, removeable sound effects cartridge. FIGS. 10-11 show one non-limiting, exemplary design for a sound effects cartridge, such as sound effects cartridge 1028, while FIG. 12 shows another exemplary design for a sound effects cartridge, such as sound effects cartridge 1228. Sound effects cartridge 1028 and sound effects cartridge 1228 may be in accordance (operationally and appearance wise) with sound effects cartridge 128 described above in FIG. 1.

Sound effects cartridge 1028 and sound effects cartridge 1228 both include a casing, as well as an internal circuit board, such as internal circuit board 1030 in FIG. 1. The internal circuit board 1030 shown in FIG. 11 may be in accordance with internal circuit board shown in FIG. 1. The adjustable selectors (e.g. knobs) 1029 located on a top of sound effects cartridge 1028 and adjustable selectors 1229 may be hand operated in one or more embodiments. The adjustable selectors 1029 and 1229 are shown for exemplary illustration only. In other embodiments, each sound effects cartridge may include between 0-5 adjustable selectors, or additional number of selectors as desired. The number of adjustable selectors, such as selectors 1029 and 1229, may depend on the type of sound effect and circuitry included within the sound effects cartridge. Some sound effects do not require any adjusting, except for volume, and because embodiments shown above for tone effects base unit (e.g. 102, 302, 702, and 902) each include rotary potentiometers that may be hand operated to turn a volume up or down, it may not be necessary to provide an adjustable selector on a top of specific sound effects cartridge. However, it is noted that a number of sound effect cartridges may require one or more adjustable selectors. For example, if sound effect cartridge 1028 is configured to provide a delay sound effect, the adjustable knobs or selectors 1029 located on top of sound effect cartridge 1028 may include a time knob, a reverb knob, and a depth knob, which a musician knows how to operate and vary to produce a desired sound combined with the delay sound effect. Sound effect cartridges, such as 128, 1028, and 1228, may differ from the shown embodiment by size, layout, enclosure type, and number and types of components.

As shown in FIGS. 10-12, the casing for sound effects cartridge 1028 and sound effects cartridge 1228 is a generally thin-walled structure that provides a housing for the effects circuit, as well as a mounting frame for the circuit board (e.g. circuit board 1030) and other electrical components. Effects circuit board 1030 is positioned within the effects cartridge casing and provides the various electrical components and wiring required to manipulate the electronic signal of the electric instrument (e.g. electric instrument 134). The casing of each sound effects cartridge (e.g. 128, 1028, and 1228) provides a housing for the effects circuit, as well as a mounting frame for the circuit board (e.g. 1030) and other electrical components. Further, effects circuit board 1030 provides the various electrical components and wiring required to manipulate the electronic signal of the electric musical instrument (e.g. electric guitar instrument 134). The card edge connector 1031 of sound effects cartridge 1028 may be configured to electrically mate with a plurality of electrical connections (i.e. contacts) located in each slot 104.

In a tone effects base unit, such as tone effects base unit 102, each slot 104 has a plurality of electrical connections that are arranged in such a way that allows for the effects circuit on a sound effects cartridge, such as sound effects cartridge 128 to be utilized in one of two channels. The channel or mode to be utilized is selectable by the orientation of the sound effects cartridge 128 when inserted. The FX mode orientation is 180 degrees from the normal mode orientation. In one embodiment, the electrical connections on each slot 104 include two +18 VDC pins, two +9 VDC pins, a cartridge sense circuit, a mode identifier circuit, a normal signal send pin, a normal signal receive pin, an FX signal send pin, an FX signal return pin, two sets of three potentiometer pins, and several ground pins including chassis ground pins.

As discussed above, in one non-limiting embodiment, each effect mode light of the set of effect mode lights 107 is a multi-lead red-green-blue (RGB) LED. In other embodiments the effect mode light may be a different type of light or split into individual lights. Further, each slot 104 is a 2×25 pin card edge female connector. In other embodiments, the slot may have more or less pins, depending on the desired operation of the sound effects system. The mode identifier circuits may include at least two electrical connections connected to different leads of the effect mode light 107, such as, one lead to a green light (e.g. color A 108) and one to a blue light (e.g. color B 109). The cartridge sense circuit communicates with tone effects base unit 102 about whether there is a sound effects cartridge 128 in one of the slots of the set of slots 104. In one embodiment, the cartridge sense circuit completes a ground to an input pin on microcontroller 106, and microcontroller 106 controls the red lead (e.g. color C 110) for each effect mode light of the set of effect mode lights 107.

Each slot of the set of slots 104 may also have at least two relays controlled by microcontroller 106 to provide switching of the signal paths. One path goes through the effects circuitry in the inserted sound effects cartridge, such as sound effects cartridge 128, while the other path bypasses the sound effect cartridge 128 altogether. One relay may control the electric instrument 134 signal path (channel) that goes to the front of an amplifier 123 (see FIG. 2), while the other relay controls the FX loop signal path (channel) to and from the back of an amplifier 123.

A sound effects cartridge, such as sound effects cartridge 128, is adapted to allow the electronic signals of electric instrument 134 to be manipulated in order to produce the desired sounds. Sound effects cartridge 128 allows the user to manipulate the electronic signal of the electric instrument 134, and the adjustable selectors 129 on the sound effects cartridge 128 allow for adjustments to achieve the desired tone or sound.

As noted above, sound effects cartridge 128 (and sound effects cartridge 1028 shown in FIGS. 10-11 and sound effects cartridge 1228 shown in FIG. 12) may include a cartridge casing, a plurality of electrical contacts (card-edge connector) on a circuit board (e.g. circuit board 130) containing an effects circuit, and as many effects controls as required by the effects circuit design including but not limited to potentiometers, switches, rotary encoders, and/or buttons. In one embodiment, the card-edge connector protrudes from the bottom of the casing of the sound effects cartridge 128 such that when sound effects cartridge 128 is inserted in to a slot of the set of slots 104 in tone effects base unit 102, sound effects cartridge 128 is electronically connected with tone effects base unit 102 and the overall system 100 shown in FIG. 1.

Additionally, the card-edge connector of each sound effects cartridge 128 is electronically connected to the effects circuit. The effects circuit in the sound effects cartridge 128 may include without limitation any electronic components commonly used in the art of tone effects, such as resistors, capacitors, transistors, integrated circuitry chips, etc. The electronic components may be arranged in any number of ways in order to produce the desired tone effect. For example, the sound effects cartridge 128 may be configured to produce the tone effect associated with any traditional effects pedals, such as a compressor, booster, auto-wah, overdrive, fuzz, distortion, phaser, flanger, chorus, reverb, delay, or amp modeler pedal, etc., without limitation to these effects.

Sound effects cartridge 128 is designed to be secured in its respective slot of the set of slots 104 when inserted, but able to be removed and replaced with a predetermined force. The sound effects cartridge may be attached to its respective slot 104 such that sound effects cartridge 128 is configured to produce at least one sound effect, and can be quickly and easily removed and replaced with another sound effects cartridge configured to produce a different sound effect or sound effects. It is also designed that sound effects cartridge 128 be quickly removed and reinserted 180 degrees to switch the channel from normal to FX loop or vice versa.

In one exemplary, non-limiting embodiment, when sound effects cartridge 128 is inserted in the normal mode orientation, the mode identifier circuit to the green lead of effect mode light 107 is completed and the effect mode light 107 illuminates green (e.g. color A 108). In the same exemplary embodiment, when sound effects cartridge 128 is inserted in FX mode orientation, the mode identifier circuit to the blue lead is completed and the effect mode light 107 is illuminated blue (e.g. color B 109). Any time a sound effects cartridge is present, the sound effects cartridge present circuit is complete, causing microcontroller 106 to command the red lead (e.g. color C 110) of the effect mode light 107 to OFF such that the red (e.g. color C 110) effect mode light 107 is extinguished. When no cartridge is present in a slot, such as slot 104, the cartridge sense circuit is open, causing the microcontroller to command the red lead of the effect mode light to ON such that the effect mode light 107 is illuminated to red (e.g. color C 110). Additionally, the circuits to both the green and blue leads are not completed, causing the green and blue mode identifier lights to be extinguished. Those of ordinary skill in the art will appreciate that other color selections and configurations may be utilized in various embodiments without departing from the scope and spirit of the present description.

In a more general description of the circuit connection between microcontroller 106 and sound effects cartridge 128, when a sound effects cartridge, such as sound effects cartridge 128, is inserted into slot 104 in the front mode, the effect mode light 107 illuminates a predetermined color. Thus, the normal mode is based on the orientation the sound effects cartridge is inserted into slot 104. As noted above, in one embodiment, the effect mode light 107 illuminates green, which may be predetermined color A 108. With the cartridge inserted in the normal mode orientation, the signal from electric instrument 134 is fed through the effects circuitry while the signal from the FX loop of amplifier 123 is fed through a "pass-through" jumper (e.g. jumper 150) on the sound effects cartridge 128 and bypasses any manipulation by the effects circuitry.

Conversely, when the effects cartridge is inserted into the slot in the FX mode (reverse orientation from the normal mode), the effect mode light 107 will illuminate a predetermined color that differs from the normal mode. In one embodiment, the second predetermined color is blue. With the cartridge inserted in FX mode orientation, the signal from the FX loop from amplifier 123 is fed through the effects circuitry while the signal directly from the electric instrument 134 is fed through the "pass-through" jumper (e.g. jumper 150) on the sound effects cartridge 128 and bypasses any manipulation by the effects circuitry.

Figure 14:
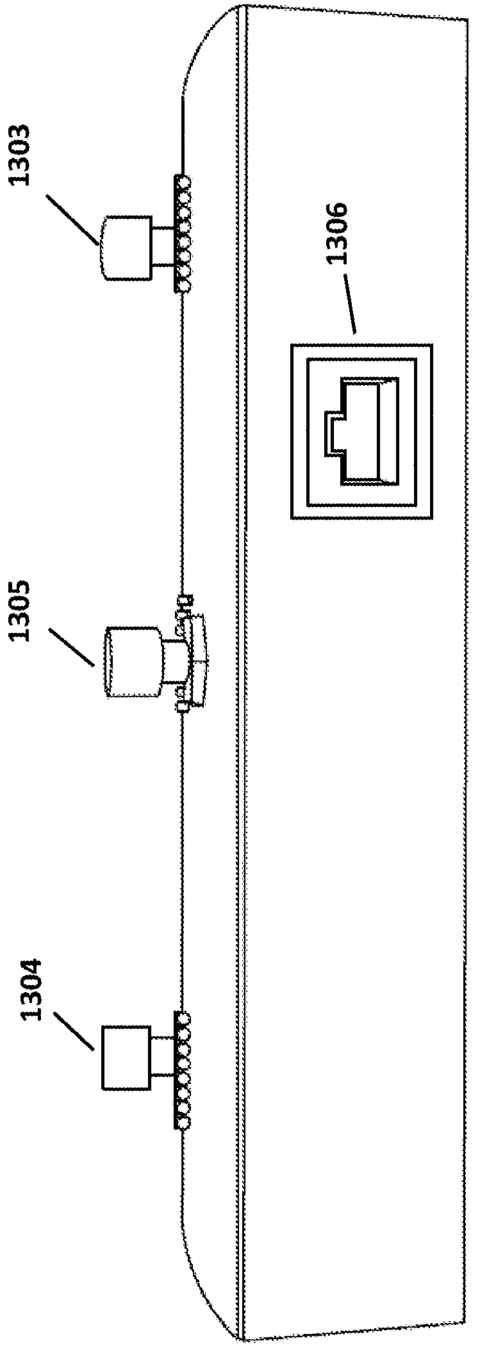
FIG. 14 is a rear view of a remote controller unit in accordance with an illustrative embodiment.

Turning to FIGS. 13-14, FIGS. 13-14 depict one embodiment of a remote control unit, such as remote control unit 1302. Remote control unit 1302 may be in accordance with remote control unit 127 shown in FIG. 1.

Remote unit 1302 may include one or more "scene set" stomp switches such as stomp switches 1303, 1304, and 1305. Remote unit 1302 may also include a connection port, such as connection port 1306 shown in FIG. 14. Additionally, remote unit 1302 may further include an onboard microcontroller (not depicted) and on-board memory (not depicted).

In the current, non-limiting embodiment shown in FIGS. 13-14, remote control unit 1302 includes two scene switches, such as scene switches 1303 and 1304, that can store two (2) groups or "scenes" of effect slots (e.g. in accordance with the 8 slots 304 shown in tone effects base unit 302, or more slots with multiple base units connected together) to activate or deactivate simultaneously. Other embodiments may have more or less scene switches, and may be configured to store groups or "scenes" for any number of slots on a tone effects base unit or series of connected tone effect base units. The third stomp switch (center) 1305 shown in this embodiment is used to set the scene data. In the embodiment shown the third stomp switch 1305 includes eight lights 1307 that may correspond to each slot of a tone effects base unit (e.g. slots 304 for tone effect base unit 302). When depressed once, stomp switch 1305 may capture the current configuration of activated slots on connected tone effect base unit(s), whereby the activated slots each include a sounds effect cartridge, such as sound effects cartridge 128. Further, when depressed once by user, stomp switch 1305 may illuminate one or more of the lights 1307 located adjacent or under the center stomp switch 1305 a predetermined color (e.g. amber colored in this embodiment) in accordance with the corresponding slots (e.g. 304) that are activated on a tone effect base unit 302. If a slot 304 on a tone effect base unit 302 is not activated, this slot will not be saved to a scene, and the light (e.g. 1307) for that respective slot will not be illuminated in the pattern. Other embodiments may have more or less lights and may also include other components including but not limited to LCD or LED displays, jacks, ports, etc.

In the shown embodiment, the user may then depress one of the two scene stomp switches (e.g. 1303 and 1304) for a predetermined number of seconds and the configuration is saved into the onboard memory to the corresponding scene, the "set" lights 1307 are extinguished, and the lights 1308 or 1309 over the corresponding scene are illuminated in the saved pattern. When the scene is activated, the lights 1308 over the corresponding scene stomp switch, such as corresponding scene stomp switch 1302, are illuminated a predetermined color. In this embodiment, the activated scene lights for scene lights 1308 may be green to indicate that they are active. Further, not all of the scene lights 1308 may be lit green; rather only the scene lights 1308 are lit green based on the corresponding activated slots that have a sound effects cartridge inserted therein and a corresponding footswitch on the tone effects base unit is activated to ON (e.g. by being stepped to illuminate a green light). Other embodiments may or may not have a different sequence for setting and activating scenes.

In the shown embodiment, when the scene is deactivated, the lights (e.g. 1308 or 1309) over the corresponding scene stomp switch (e.g. 1303 or 1304) may switch to illuminate a different predetermined color. In this embodiment, the deactivated scene lights 1309 for corresponding stomp switch 1304 may be lit in a red lit to indicate that these scene lights, and corresponding slots on a tone effects base unit are deactivated. Other embodiments may or may not have a different sequence for deactivating scenes.

In this exemplary embodiment of remote control unit 1302, remote control unit 1302 may connect to a tone effects base unit, such as tone effects base unit 302, using a standard RJ-45 port and ethernet cable and uses the on-board microcontroller on remote control unit 1302 to communicate with the microcontroller (e.g. microcontroller 106) located in tone effects base unit 302. Other connecting means or components to connect remote control unit 1302 to a tone effects base unit, such as tone effects base unit 302 may alternatively be used.

In addition to the above, in this embodiment, power for the remote unit may be supplied through connecting port 1306 and cable, although alternative configurations may be envisioned for supplying power to remote control unit 1302. For example, remote control unit 1302 may alternative, or additionally, use batteries or be connected to a power source 122 such as an electrical outlet with or without the use of an AC adapter.

Figure 15:
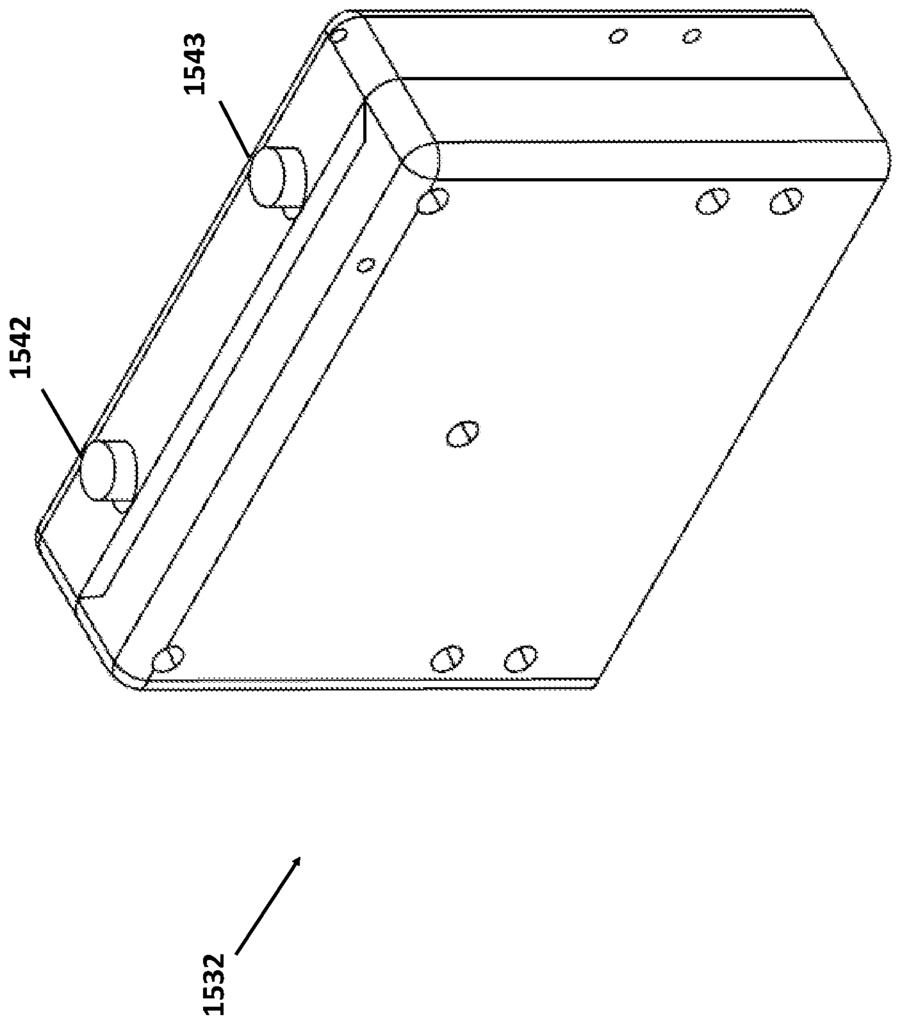
FIG. 15 is a perspective view of an input/output cartridge for use with existing pedals and a tone effects base unit in accordance with an illustrative embodiment.

Continuing with FIG. 15, FIG. 15 shows an exemplary illustration of a design for an input/output cartridge, such as input/output cartridge 1532. Input/output cartridge 1532 may be in accordance with input/output cartridge 132. Input/output cartridge 1532, in one or more embodiments, may be reversible, just as sound effects cartridge 128. Indeed, input/output cartridge 1532 operates in a same/similar manner as reversible sound effects cartridge 128, except input/output cartridge 1532 allows a musician to connect at least one of his or her existing sound effects pedals to a tone effects base unit, such as tone effect base unit 102. As noted above, many existing sound effects pedals exist that provide a number of sound effects, including, but not limited to, distortion pedals, chorus pedals, reverb pedals, and/or multi-effects pedals. Thus, input/output cartridge 1532, as shown in FIG. 15, may allow a musician to connect his or her existing sound effect pedal by connecting a cable from an output port of the existing sound effect pedal (not shown) to receive port 1542 of input/output cartridge 1532, and by connecting a cable from an input port of the existing sound effect pedal (not shown) to send port 1543 of input/output cartridge 1532. The sound effects of the existing effect pedal may be connectable to amplifier 123 via one of the two channels noted above, namely, the normal channel or the FX loop channel, so that the sound output from the electronic instrument 134 as manipulated by the sound effects included in the connected sound effects pedal produces a modified sound as intended by the musician.

Figure 16:
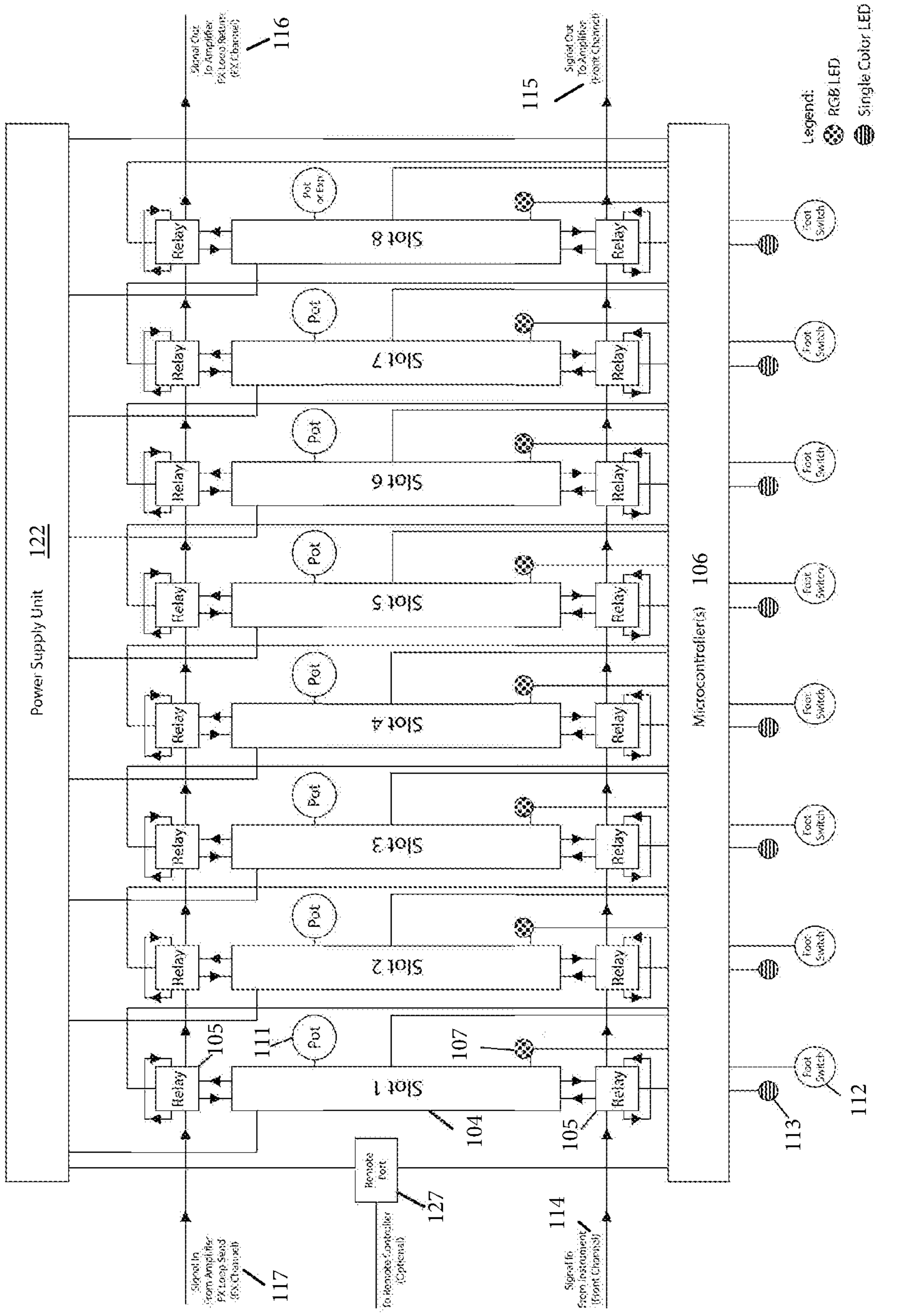
FIG. 16 is a schematic drawing for a tone effects base unit coupled to an electric instrument, amplifier, and remote control unit in accordance with an illustrative embodiment.

Turning to FIG. 16, FIG. 16 shows an exemplary illustration of the schematics of a tone effects system, in accordance with one embodiment of the present invention. Tone effects system 1602 may be reproducible for any one of the tone effects base unit described herein and shown in the attached drawings, including tone effects base unit 102, 302, 702, and 902. The schematics shown in FIG. 16 show how a plurality of slots 104, a stomp switch or footswitch 112 associated with each of the slots 104, are connected to a multi-colored effect mode light 107 associated with each of the slots 104, a single color LED status light 113 associated with each foot switch 112, a rotary potentiometer 111 associated with each of the slots 104, a remote controller port, a microcontroller 106, and a power supply source 122. The FX loop is connected to the back (e.g. back side 125) of the amplifier 123 using the FX loop receive (in) jack 116 and the FX loop send (out) jack 117, while the electric instrument (e.g. electric instrument 134) is connected to the front side (e.g. front side 124) of the amplifier (e.g. amplifier 123) by at least one signal-in terminal (e.g. 114), and at least one signal-out terminal (e.g. 115).

In one or more embodiments, microcontroller 106 receives input from the cartridge sense circuit and foot switches or stomp switches 112, controls the effect mode lights 107 and status lights 113, and communicates with the remote control unit 127 (if connected). In one embodiment, microcontroller 106 has twenty-four (24) digital input electrical contacts, thirty-three (33) digital output electrical contacts, and a communications bus. In other embodiments, there may be more or less input and output electrical contacts used.

Microcontroller 106 may receive input from the foot switches 112 to control the activation of the relays (e.g. relays 105) and effect status light 113 of the corresponding slot of the set of slots 104. As shown in FIG. 1, the foot switches 112 included in tone effects base unit 102 is a momentary stomp style switch that is each connected to an input pin on microcontroller 106 of each tone effects base unit. When a sound effects cartridge, such as sound effects cartridge 128 is present in the slot 104 and the corresponding foot switch 112 is activated, microcontroller 106 commands both relays (whereby each slot has at least two relays 105) corresponding to the slot 104 to change state from "bypass" to "active" and commands the effect status light 113 to ON (and to illuminate a pre-determined color). In the shown embodiment in FIG. 1-6, the effect status light 113 is a single color LED. In other embodiments, the effect status light may be any type of light, or series of multiple lights, and may show multiple colors.

In one embodiment, the sound effects cartridge 128 sense circuit consists of a digital input electrical contact on the microcontroller 106 connected to the center electrical contact on one side of the slot 104 and the opposite electrical contact on the slot 104 is connected to ground. With a sound effects cartridge, such as sound effects cartridge 128 (or alternatively an input/output cartridge 132) inserted, the circuit between the first electrical contact and the second electrical contact of the slot is completed, so that microcontroller 106 senses that a sound effects cartridge 128 (or input/output cartridge 132) is present. With no effects cartridge inserted, the circuit between the first electrical contact and the second electrical contact of the slot is open, so the microcontroller 106 senses no cartridge is present.

If there is no sound effects cartridge 128 inserted in a slot on tone effects base unit 102, microcontroller 106 commands a red light (e.g. color C 110) for the effect mode light 107 associated with the slot to ON and does not allow the relays for the corresponding slot to be switched from the bypass state. If sound effects cartridge 128 is removed from a slot while the effect is activated, microcontroller 106 may generally immediately command the relays to the bypass state, and commands the effect mode light to illuminate red (e.g. color C 110) also.

In one embodiment, when a sound effects cartridge, such as sound effects cartridge 128 is inserted, there may be a delay of a predetermined amount of time before enabling any relay activity for any relays 105 included in tone effects base unit 102. This will ensure a good connection of the signal circuits before switching to reduce channel noise and prevent damage to electrical components or other equipment. In another embodiment, the electrical contacts on the card edge connector of sound effects cartridge 128 may vary in length to prioritize circuit disconnection when the cartridge is removed.

In another description of how microcontroller 106 may operate similar to that provided above, a digital input electrical contact on microcontroller 106 is set to HIGH and connected to an electrical contact on a foot switch, such as foot switch 112, corresponding to the slot that the foot switch will be controlling. The electrical contact of the other pole is connected to the ground. When the foot switch 112 is depressed, this closes the circuit for the input electrical contact on the microcontroller 106, drawing it to LOW. This tells the microcontroller 106 activate both relays for the corresponding slot, causing them to switch from BYPASS position to ACTIVE position. If the foot switch 112 is depressed again, microcontroller 106 activates the relays again to switch from ACTIVE to BYPASS state. If the cartridge effects card (e.g. 128) is removed, this opens the card sense circuit, causing microcontroller 106 to immediately command both relays of the corresponding slot to the BYPASS mode and illuminate the effect mode light 107 to a predetermined color, such as the color red (e.g. color C 110) to indicate that there is no sound effect cartridge located in that corresponding slot.

As provided above, in a more general description of the circuit connection between microcontroller 106 and sound effects cartridge 128, when a sound effects cartridge, such as sound effects cartridge 128, is inserted into slot 104 in the front mode, the effect mode light 107 illuminates a predetermined color. Thus, the front mode is based on the orientation the sound effects cartridge is inserted into slot 104. As noted above, in one embodiment, the effect mode light 107 illuminates green, which may be predetermined color A 108 for an effect mode light 107. With the cartridge inserted in the front mode orientation, the signal from electric instrument 134 is fed through the effects circuitry while the signal from the FX loop of amplifier 123 is fed through a "pass-through" jumper (e.g. jumper 150) on the sound effects cartridge 128 and bypasses any manipulation by the effects circuitry. In other non-limiting embodiments, the FX channel relay corresponding to the slot may be commanded by the microcontroller to remain in bypass state rather than utilizing a "pass-through" jumper (e.g. jumper 150).

Conversely, when the effects cartridge is inserted into the slot 104 in the FX mode (reverse orientation from the front mode), the effect mode light 107 will illuminate a predetermined color that differs from the front mode. In one embodiment, the second predetermined color is blue. With the cartridge inserted in FX mode orientation, the signal from the FX loop from amplifier 123 is fed through the effects circuitry while the signal from the electric instrument 134 is fed through the "pass-through" jumper (e.g. jumper 150) on the sound effects cartridge 128 and bypasses any manipulation by the effects circuitry. In other non-limiting embodiments, the front channel relay corresponding to the slot may be commanded by the microcontroller to remain in bypass state rather than utilizing a "pass-through" jumper (e.g. jumper 150).

Figure 17:
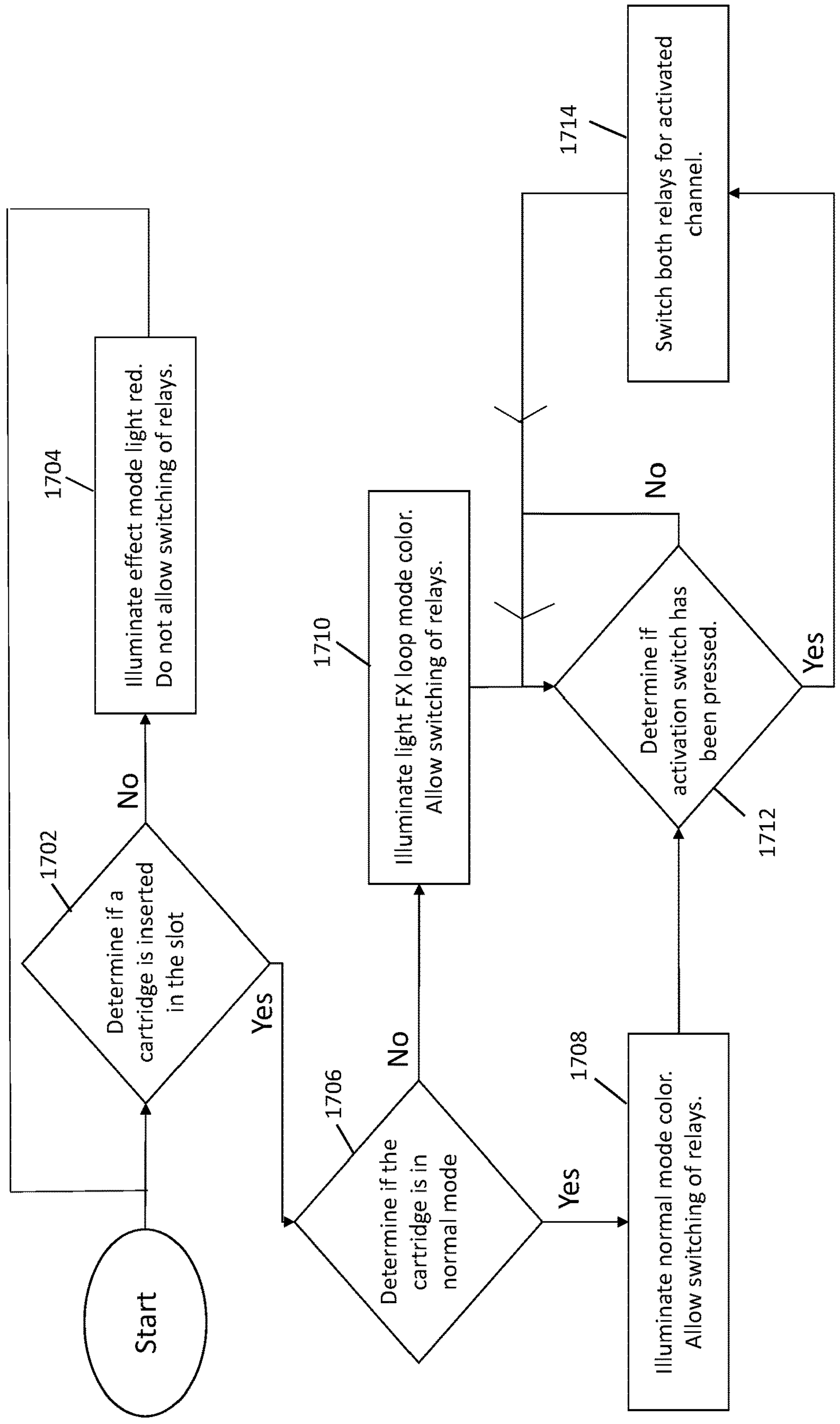
FIG. 17 is a flowchart showing an exemplary process for using a tone effects base unit with in accordance with an illustrative embodiment.

Turning to FIG. 17, FIG. 17 is a flowchart of an exemplary process of illuminating the effect mode light, enabling relays for activation, and activating relays on a tone effect base unit in accordance with one or more embodiments. FIG. 17 shows a process described above with respect to tone effects base unit 102, which may include microcontroller 106, relays 105, and an effect mode light, such as effect mode light 107 having three (or more) predetermined colors (e.g. colors A-C 108-110).

A process may begin at step 1702 by determining if a sound effects cartridge, such as sound effect cartridge 128 has been inserted into a slot (e.g. slot 104) of a tone effects base system (e.g. 102). In one embodiment, microcontroller 106 may determine if a sound effects cartridge is inserted at step 1702. If not, then the process may proceed to step 1704 and illuminate an effect mode light, such as effect mode light 107 red (e.g. color C 110). The process may be configured to loop back to 1702 to repeatedly check whether there is a sound effects cartridge, such as sound effect cartridge 128 inserted into a slot (e.g. slot 104).

Alternatively, if it is affirmatively determined that a sound effect cartridge is located in a slot, then the process may proceed to step 1706, whereby a determination is made (e.g. by microcontroller 106) whether the sound effects cartridge is positioned in a front or normal mode orientation. If yes, then the process may proceed to step 1708, whereby the normal mode color is illuminated on effects mode light 107 to a first predetermined color associated with the front or normal mode orientation (e.g. color A 108 in FIG. 1). In some non-limiting embodiments, this first predetermined color may be green (without limitation thereto).

If the answer to the query at step 1706 is no, then the process proceeds to step 1710 and a determination is affirmatively made that the sound effects cartridge is inserted 180 degrees from normal so as to correspond to a FX loop. Accordingly, at step 1710, a second predetermined color (e.g. color B 109) may be illuminated to indicate the FX loop mode color from the effects mode light 107.

In one or more embodiments, the process may continue to step 1712, whereby a determination is made whether a foot switch (e.g. foot switch 112) has been activated or pressed (e.g. via by a user's foot). If not, then the process may continue to loop until the answer to the query at step 1712 is yes.

If the answer to the query at step 1712 is determined to be yes (i.e. the activation switch or footswitch 112 has been pressed), then the process may allow for switching for both relays for the activated channel, whether the activated channel is the normal, front mode channel or the FX loop channel. Further, while not shown in FIG. 17, in one or more embodiments, a status light, such as status light 113, associated with each foot switch 112 may also be lit (activated to ON) when footswitch 112 is activated. Further, the status light, such as status light 113, may be turned to OFF and not lit up if the foot switch 112 is deactivated.

It is implied in the process of FIG. 17 that the tone effects base unit, such as tone effects base unit 102, is coupled to or includes a power source such that the power switch is turned ON for the various lights and relays to function in accordance with a process included above in FIG. 17.

The foregoing description includes one or more embodiments for a useful and improved system and method for layering or manipulating sound effects onto a sound produced from an electric instrument using one or more reversible, removeable sound effects cartridges that are insertable into a tone effects base unit. Unlike conventionally available methods and systems for producing sound effects for an electric instrument (e.g. electric guitar), the tone effect base unit and reversible sound effects cartridges in accordance one or more embodiments herein, may advantageously give a musician much more creativity and control by placing interchangeable and reversible tone effects controls within reach while the instrument is being played, while eliminating the clutter, confusion, and failure points of cables connecting multiple effects pedals together, which is an ongoing issue with existing pedals. Further, the embodiments provided in this disclosure may also improve ergonomics and safety for a musician using the system for a tone system base unit described herein, and may ensure positive activation/deactivation of the intended effect when desired by the musician.

Nevertheless, even though sound effect pedals may provide some additional clutter, at times it may be desirable for a musician to utilize a sound effect pedal if he or she does not happen to have the corresponding sound effect cartridge. In such circumstances, one or more embodiments provided above include an input and output cartridge that may be inserted into one or more slots of a tone effects base unit, according to one or more embodiments, described herein, and coupled to an existing sound effect pedal to offer the musician the ability to pair his or her sound effect pedal to a tone effects base unit. Many other uses and applications are also envisioned with the one or more embodiments described herein.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed:

1. A tone effects base unit, comprising:
- a housing for the tone effects base unit, the housing further comprising:
  - one or more slots integrated into the housing;
  - a plurality of connectors situated within each slot of the one or more slots;
  - one or more effect mode lights, wherein the one or more effect mode lights is associated with a different slot of the one or more slots;
  - one or more foot switches, wherein each of the one or more foot switches is associated with a different slot from the one or more slots;
  - one or more of status lights, wherein each of the one or more status lights are associated with a different foot switch of the one or more foot switches;
  - a microcontroller configured to communicate with the plurality of connectors, the one or more slots, the one or more effect mode lights, the one or more foot switches, and the one or more status lights;
  - at least one instrument signal input port;
  - at least one signal output port;
  - at least one FX input port; and
  - at least one FX output port, wherein the at least one instrument signal input port is configured to be connectable to an electric instrument, and the at least one signal output port, the at least one FX input port, and the at least one FX output port are configured to be connectable to an amplifier.

2. The tone effects base unit of claim 1, further comprising one or more rotary potentiometers associated with each slot of the one or more slots, wherein the one or more rotary potentiometers is configured to change a tone effect or level for a reversible sound effect cartridge that is insertable into a particular slot of the one or more slots.

3. The tone effects base unit of claim 1, wherein the one or more effect mode lights is configured to produce at least three predetermined colors, wherein the one or more effect mode lights is configured to illuminate a first predetermined color if a reversible sound cartridge is inserted into the one or more slots in a normal mode, to illuminate a second predetermined color if a reversible sound cartridge is oriented 180 degrees in the one or more slots in a FX loop mode, and to illuminate a third predetermined color if the reversible sound cartridge is not inserted into the one or more slots.

4. The tone effects base unit of claim 1, further comprising, a remote control unit port, wherein a remote control unit is configured to be connected to the remote control unit port.

5. The tone effects base unit of claim 4, wherein the remote control unit stores scene sets of reversible sound cartridges inserted into the one or more slots of the tone effects base unit.

6. The tone effects base unit of claim 1, wherein each slot of the one or more slots is electronically coupled to at least two relays associated with the microcontroller.

7. A system for a tone effects base unit, comprising:
- a housing for the tone effects base unit, the housing further comprising:
  - one or more slots integrated into the housing;
  - a plurality of connectors situated within each slot of the one or more slots;
  - one or more effect mode lights, wherein the one or more effect mode lights is associated with a different slot of the one or more slots, wherein the one or more effect mode lights comprises a set of predetermined colors;
  - one or more foot switches, wherein each of the one or more foot switches is associated with a different slot from the one or more slots;
  - one or more of status lights, wherein each of the one or more status lights are associated with a different foot switch of the one or more foot switches;
  - a microcontroller configured to communicate with the plurality of connectors, the one or more slots, the one or more effect mode lights, the one or more foot switches, and the one or more status lights;
  - at least one instrument signal input port;
  - at least one signal output port;
  - at least one FX input port; and
  - at least one FX output port, wherein the at least one instrument signal input port is configured to be connectable to an electric instrument, and the at least one signal output port, the at least one FX input port, and the at least one FX output port are configured to be connectable to an amplifier; and
- at least one reversible sound effects cartridge, wherein the at least one reversible sound effects cartridge can be inserted into one of two channels, wherein the orientation of the at least one reversible sound effect cartridge into a corresponding slot of the one or more slots determines which channel is activated for the at least one reversible sound cartridge.

8. The system of claim 7, wherein the orientation of the at least one reversible sound effects cartridge is either in normal mode or in FX loop mode, wherein a first channel is associated with the normal mode and a second channel is associated with the FX loop mode.

9. The system of claim 8, wherein in the FX loop mode, the reversible sound effects cartridge is oriented 180 degrees from the normal mode.

10. The system of claim 8, wherein if the orientation of the reversible sound effects cartridge is in the normal mode, the FX loop is bypassed, and further wherein if the orientation of the reversible sound effects cartridge is in the FX loop mode, then the normal mode is bypassed.

11. The system of claim 7, wherein the at least one instrument signal input port is configured to be connectable to the electric instrument via a cable, and the at least one signal output port, the at least one FX input port, and the at least one FX output port are configured to be connectable to either a front side or a back side of the amplifier via one or more cables.

12. The system of claim 11, wherein the at least one reversible sound cartridge includes a circuit board and circuitry to produce one or more sound effects that is applicable to sound produced from the electric instrument and as emitted from the amplifier.

13. A method for using a tone effects base unit and at least one reversible sound effects cartridge, the method comprising:

providing the at least one reversible sound effects cartridge and inserting the at least one reversible sound effects cartridge into a particular slot of a set of slots on the tone effects base unit, further comprising:

inserting the at least one reversible sound effects cartridge in a normal mode orientation into the particular slot, wherein inserting the at least one reversible sound effects cartridge in the normal mode allows one or more sound effects of the at least one reversible sound effect cartridge to be applied to sound produced from an associated electric instrument out of a connected amplifier without passing the sound through the FX loop; and inserting the at least one reversible sound effects cartridge in a FX loop mode orientation by inserting the at least one reversible sound effects cartridge 180 degrees from the normal mode orientation into the particular slot, wherein inserting the at least one reversible sound effects cartridge in the FX loop mode orientation allows the one or more sound effects of the at least one reversible sound effects cartridge to be applied to the sound produced from the associated electric instrument out of the connected amplifier by passing through the FX loop.

14. The method of claim 13, further comprising:

determining whether the at least one reversible sound effects cartridge is inserted in the particular slot of one or more slots disposed on the tone effects base unit;

responsive to determining that the reversible sound effects cartridge is inserted into the particular slot, determining whether the reversible sound effects cartridge is oriented in the normal mode orientation or in the FX loop mode orientation;

if the at least one reversible sound effects cartridge is oriented in the normal mode orientation, illuminating a first predetermined color on an effects mode light associated with the particular slot, wherein the first predetermined color corresponds to the normal mode orientation;

if the reversible sound effects cartridge is oriented in the FX loop mode orientation, illuminating a second predetermined color on an effects mode light associated with the particular slot, wherein the second predetermined color corresponds to the FX loop mode orientation; and responsive to a determination that no reversible sound effects cartridge is inserted into the particular slot, illuminating a third predetermined color on an effects mode light, wherein the third predetermined color corresponds to an absence of a reversible sound effects cartridge in the particular slot.

15. The method of claim 13, further comprising coupling the tone effects base unit to a remote control unit, and storing one or more scene sets on the remote control unit, wherein the scene sets corresponds to activated slots on the tone effects base unit.

16. The method of claim 13, further comprising, inserting an input/output cartridge into the particular slot instead of the at least one reversible sound effects cartridge, wherein the input/output cartridge is coupled to a sound effects pedal, and further wherein one or more sound effects produced by the sound effects pedal is transmitted through the input/output cartridge when inserted into the particular slot.

17. The method of claim 13, wherein the electric instrument is an electric guitar.

18. The method of claim 13, further comprising, adjusting one or more selectors disposed on the at least one reversible cartridge to manipulate the one or more sound effects associated with the at least one reversible cartridge.

* * * * *